US009678208B2

(12) United States Patent
Volfson

(10) Patent No.: US 9,678,208 B2
(45) Date of Patent: *Jun. 13, 2017

(54) CROSSWIND SPEED MEASUREMENT BY OPTICAL MEASUREMENT OF SCINTILLATION

(71) Applicant: Torrey Pines Logic, Inc., San Diego, CA (US)

(72) Inventor: Leo Volfson, San Diego, CA (US)

(73) Assignee: Torrey Pines Logic Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/194,794

(22) Filed: Jun. 28, 2016

(65) Prior Publication Data

US 2017/0082749 A1    Mar. 23, 2017

Related U.S. Application Data

(63) Continuation of application No. 14/832,891, filed on Aug. 21, 2015, now Pat. No. 9,429,653, which is a continuation of application No. 13/870,828, filed on Apr. 25, 2013, now Pat. No. 9,127,910.

(60) Provisional application No. 61/669,516, filed on Jul. 9, 2012.

(51) Int. Cl.
*G06F 19/00* (2011.01)
*G01S 17/58* (2006.01)
*F41G 3/08* (2006.01)
*G01S 17/95* (2006.01)

(52) U.S. Cl.
CPC ............... *G01S 17/58* (2013.01); *F41G 3/08* (2013.01); *G01S 17/95* (2013.01)

(58) Field of Classification Search
CPC .............. G06G 7/80; F41G 3/065; F41G 3/08
USPC ................................................ 235/404, 405
See application file for complete search history.

(56) References Cited

U.S. PATENT DOCUMENTS

| 4,028,673 A | 6/1977 | Taylor et al. |
| 4,182,570 A | 1/1980 | Courrier et al. |
| 6,247,259 B1 | 6/2001 | Tsadka et al. |
| 7,005,971 B2 | 2/2006 | Stewart et al. |
| 7,739,823 B2 | 6/2010 | Shapira et al. |
| 8,279,423 B2 | 10/2012 | Shapira |
| 9,127,910 B2 * | 9/2015 | Volfson ................. G01S 17/107 |

* cited by examiner

*Primary Examiner* — Daniel St Cyr
(74) *Attorney, Agent, or Firm* — Fish & Richardson P.C.

(57) ABSTRACT

The present disclosure describes methods and systems for measuring crosswind speed by optical measurement of laser scintillation. One method includes projecting radiation into a medium, receiving, over time, with a photodetector receiver, a plurality of scintillation patterns of scattered radiation, comparing cumulative a radiation intensity for each received scintillation pattern of the received plurality of scintillation patterns, and measuring a cumulative weighted average cross-movement within the medium using the compared cumulative radiation intensities.

20 Claims, 17 Drawing Sheets

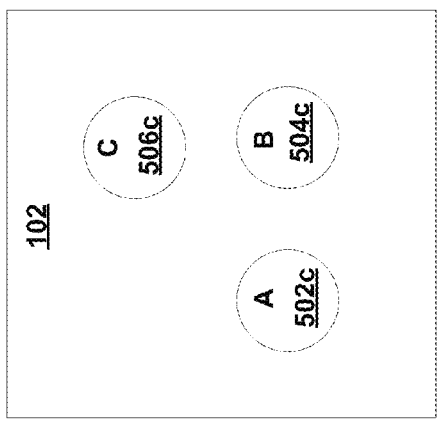
FIG. 5C
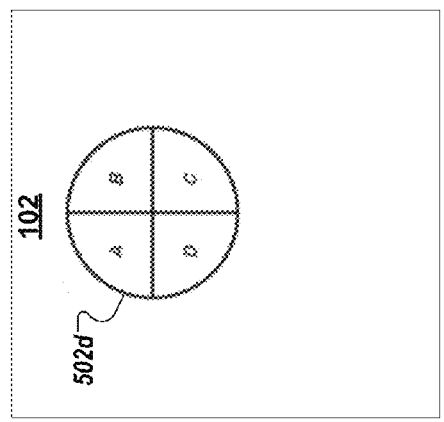
FIG. 5D
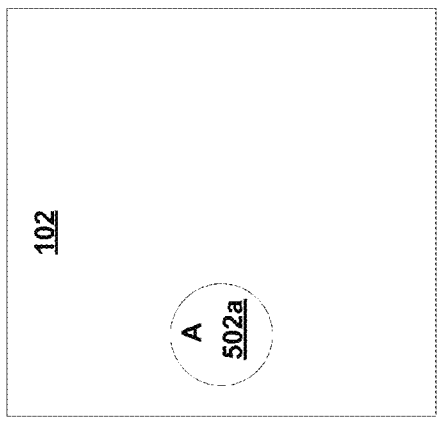
FIG. 5A
FIG. 5B

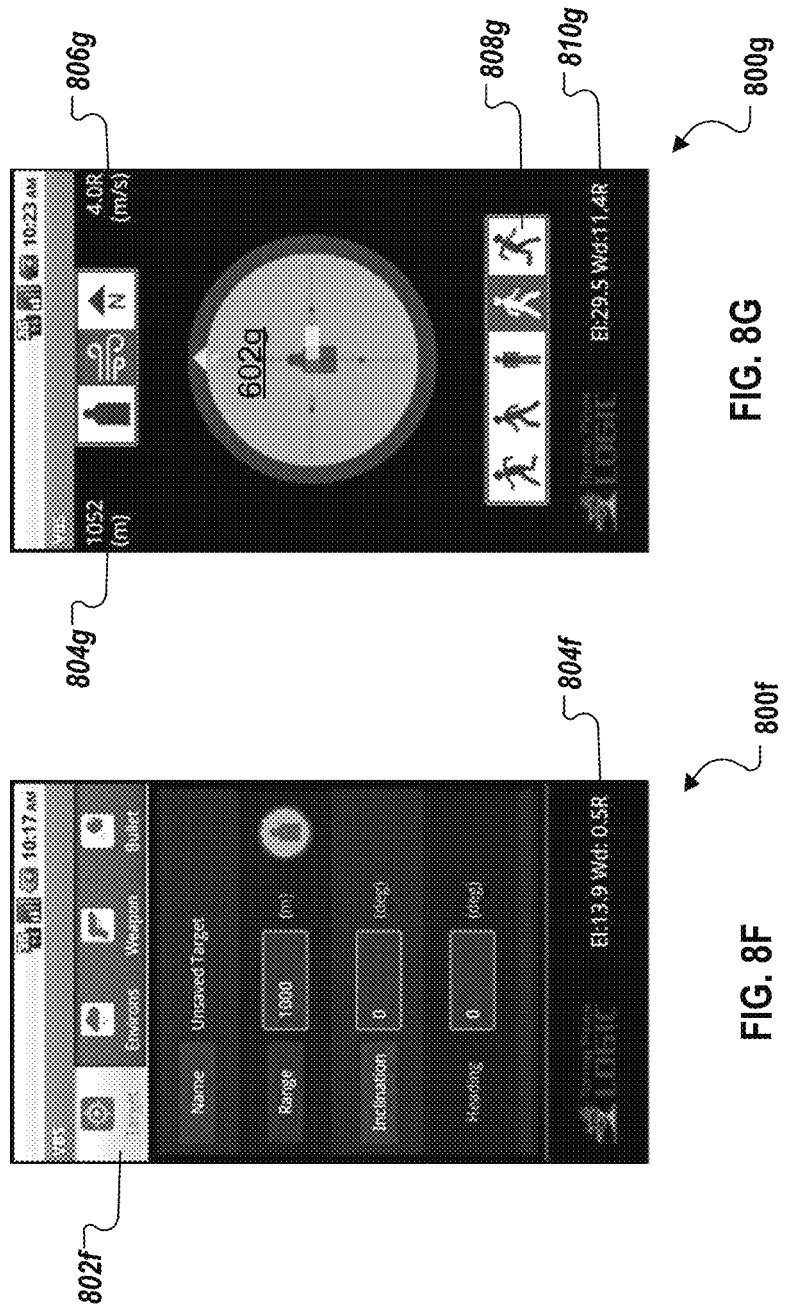

FIG. 9A
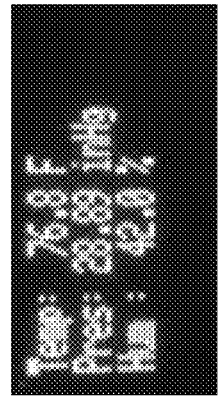
FIG. 9B
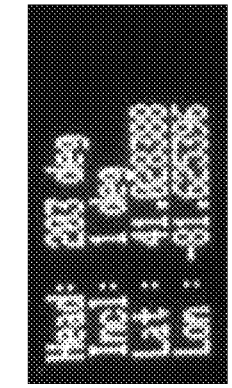
FIG. 9C
FIG. 9D

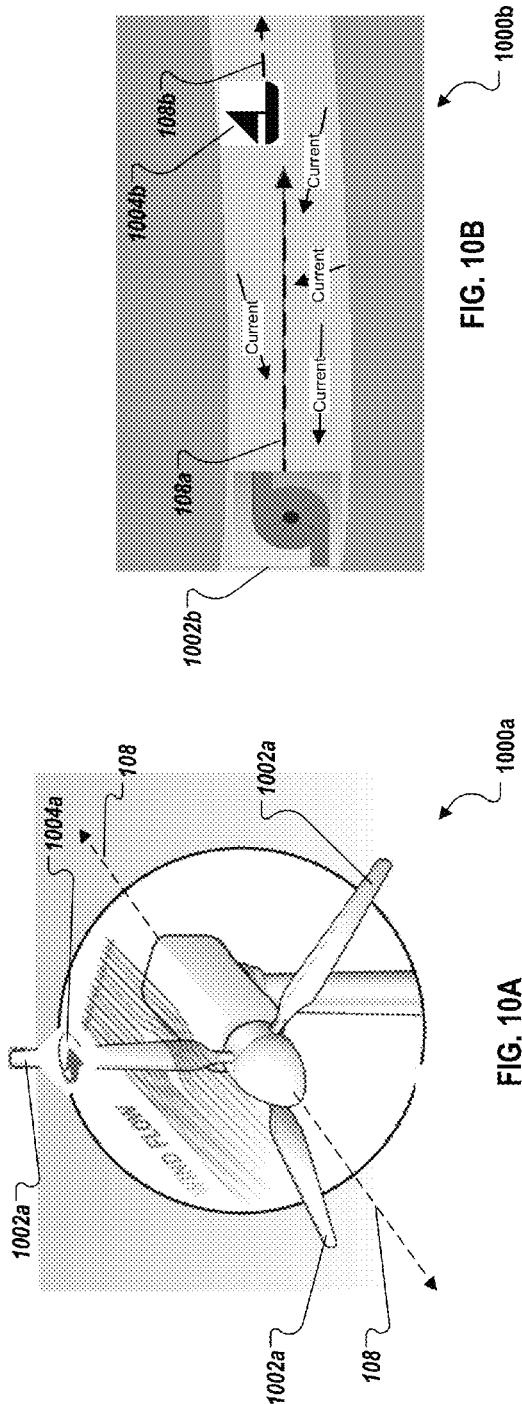

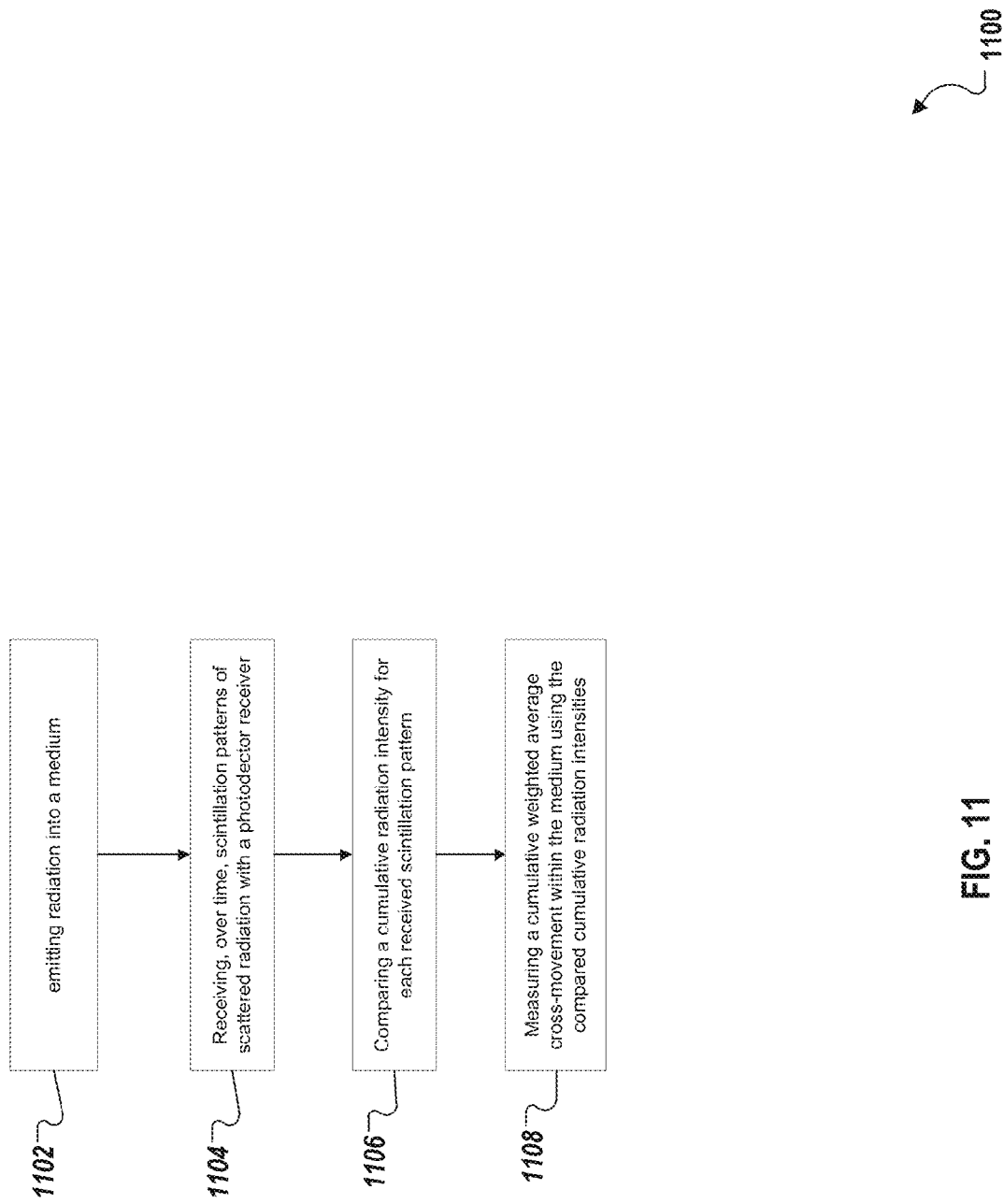

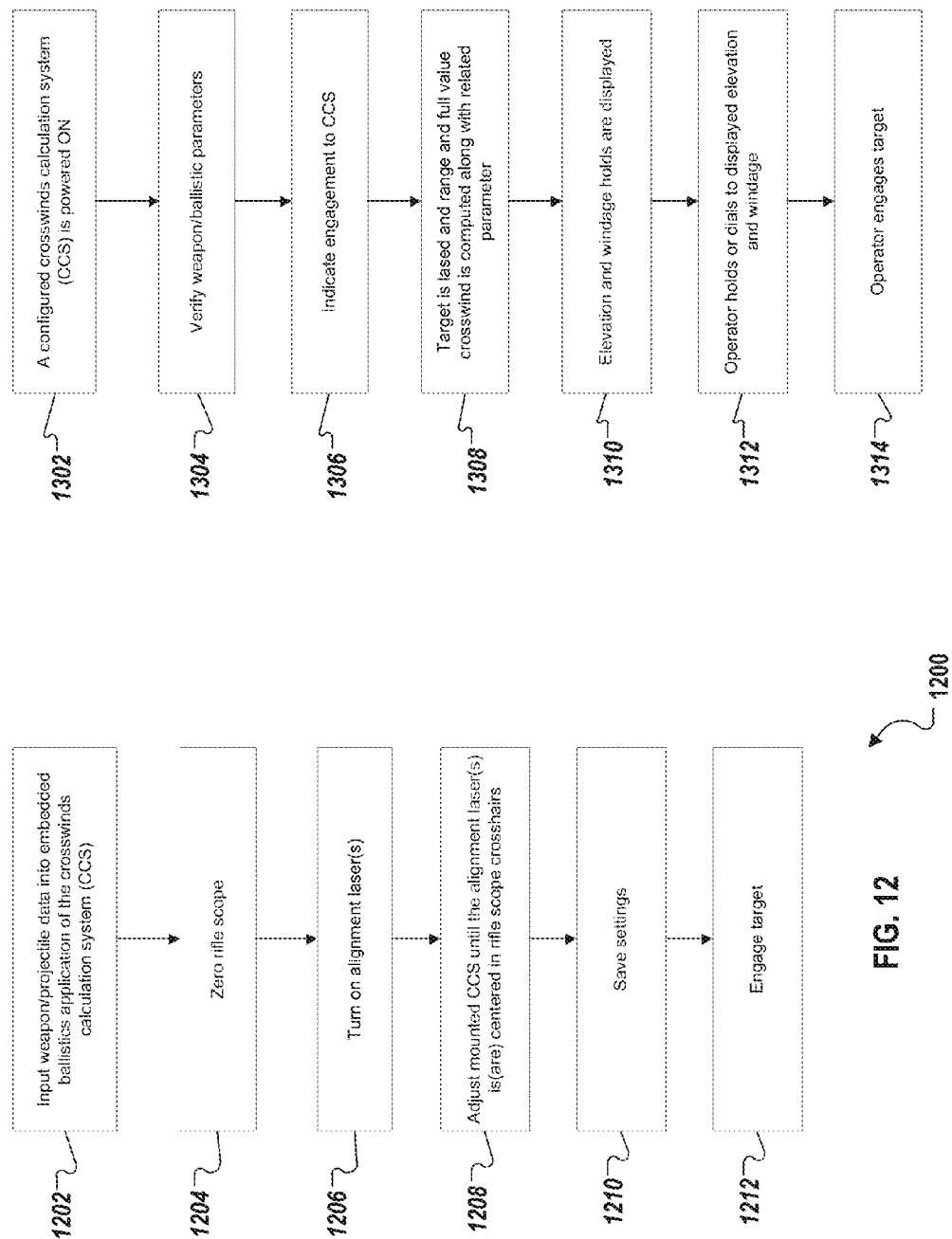

CROSSWIND SPEED MEASUREMENT BY OPTICAL MEASUREMENT OF SCINTILLATION

This Application is a continuation of U.S. patent application Ser. No. 14/832,891, filed on Aug. 21, 2015, which claims priority under 35 U.S.C. §120 to U.S. patent application Ser. No. 13/870,828, now U.S. Pat. No. 9,127,910, filed on Apr. 25, 2013, which claims priority under 35 U.S.C. §119(e) to U.S. Provisional Patent Application Ser. No. 61/669,516, filed on Jul. 9, 2012. The entire contents of U.S. Provisional Patent Application Ser. No. 61/669,516, U.S. Pat. No. 9,127,910, and U.S. patent application Ser. No. 14/832,891 are hereby incorporated by reference.

BACKGROUND

When in flight, the trajectory of a projectile fired from a weapon into the atmosphere at an intended target is affected by ballistic factors including temperature, atmospheric pressure, humidity, air friction (drag), inclination angle, Coriolis drift due to latitude, air movement (wind), and the like. A crosswind is a wind moving across the projectile's trajectory and pushing against the projectile; causing the projectile to deviate from its current trajectory, for example to a side. At longer target ranges, crosswind effects on a projectile must be taken into account. As crosswinds may vary in speed at different points along the projectile's planned trajectory, compensating for crosswind effects normally requires estimations/measurements to be made at different ranges between the weapon and the intended target and an average crosswind speed to be calculated to properly account for cumulative crosswind effects on the projectile. Crosswind speeds are often estimated by manual, visual observations made by a weapon operator and/or an assistant target spotter and then an adjustment (a target offset) is made to a weapon point-of-aim using a weapon's sights and/or physical adjustment of the weapon's direction-of-aim in order to correct for estimated crosswind effects on a fired projectile. Manual observation accuracy is affected by training, experience, and/or skills of a weapon operator/spotter. Inaccurate observations/estimations can introduce unacceptable error into offset calculations and result in a projectile missing a target.

SUMMARY

The present disclosure relates to methods and systems for measuring crosswind speed by optical measurement of laser scintillation. One method includes One method includes projecting radiation into a medium, receiving, over time, with a photodetector receiver, a plurality of scintillation patterns of scattered radiation, comparing cumulative a radiation intensity for each received scintillation pattern of the received plurality of scintillation patterns, and measuring a cumulative weighted average cross-movement within the medium using the compared cumulative radiation intensities.

Other implementations of this aspect include corresponding systems configured to perform the actions of the method. One or more systems can be configured to perform particular actions of the method. The systems can include one or more computers configured to perform the particular operations or actions by virtue of having software, firmware, hardware, computer-readable media or a combination of software, firmware, hardware, or computer-readable media installed on the systems. One or more computer programs can be configured to perform particular operations or actions by virtue of including instructions that, when executed by a computer, cause the computer to perform the actions.

The foregoing and other implementations can each optionally include one or more of the following features, alone or in combination:

A first aspect, combinable with the general implementation, wherein the medium is one of air or water.

A second aspect, combinable with any of the previous aspects, further comprising: calculating a ballistic solution for a projectile using at least the calculated cumulative weighted average cross-movement within the medium, and calculating a weapon aiming offset using the calculated ballistic solution.

A third aspect, combinable with any of the previous aspects, further comprising determining that a particular scintillation pattern is moving, determining a direction-of-movement for the particular scintillation pattern, and determining a speed-of-movement for the particular scintillation pattern.

A fourth aspect, combinable with any of the previous aspects, wherein the determination that the particular scintillation pattern is moving is performed by a cross-covariance computation between two or more scintillation patterns.

A fifth aspect, combinable with any of the previous aspects, further comprising providing a multi-axis scintillation pattern movement determination.

The subject matter described in this specification can be implemented in particular implementations so as to realize one or more of the following advantages. First, chosen weapon accuracy is enhanced by mitigating crosswind effects on fired projectiles. Second, laser scintillation allows for highly-accurate, real-time crosswind speed measurements. Third, the crosswind speed measurement can be calculated as a weighted average crosswind speed along the entire path from a weapon to target providing complete target path coverage including ranges beyond accurate manual observation and/or estimation capabilities. Fourth, accurate crosswind speed measurements can be calculated using a single pixel receiver. Fifth, accurate crosswind speed measurements and/or point-of-aim offsets can be made in different weather and atmospheric conditions. Sixth, due to provided real-time, high-accuracy offset calculations, concealment/safety of a weapon operator and/or assistant target spotter is enhanced by maximizing weapon-to-target engagement ranges and minimizing weapon operator, assistant target spotter and/or weapon movement necessary to adjust a projectile point-of-aim to impact a desired target. Seventh, training of weapon operators and/or assistant target spotters is enhanced by providing real-time feedback and/or correction of manual, visual crosswind speed observations/estimations and offset calculations for various target ranges. Eighth, the crosswind calculation system (CCS) combines a ballistic calculator, receiver(s) and laser emitter(s) in a compact/portable, weapon-mountable package. Ninth, the CCS can be networked with other CCS units and/or suitable weather/atmospheric data systems to enhance accuracy of crosswind calculations, ballistic solutions, and related provided data and/or functions. Other advantages will be apparent to those skilled in the art. Tenth, one or more components of the CCS can be coupled with other instruments to provide useful combined instrumentalities.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIGS. 5A-5D illustrate exemplary CCS unit receiver configurations according to various implementations.

FIG. 8A is an example screenshot of a ballistic solver application (BSA) user interface according to an implementation.

FIG. 8B is an example screenshot of an advanced bullet properties data entry dialog user interface for the BSA according to an implementation.

FIGS. 8F-8G are example screenshots of mobile device user interfaces for the BSA according to an implementation.

FIGS. 9A-9D illustrate example CCS unit digital display screenshots according to an implementation.

FIGS. 10A-10D illustrate additional applications for CCS technology.

FIG. 11 is a flow chart of an example method of measuring crosswinds according to an implementation.

FIG. 12 is a flow chart of an example pre-mission readiness method according to an implementation.

FIG. 13 is a flow chart of a mission engagement method according to an implementation.

Like reference numbers and designations in the various drawings indicate like elements.

DETAILED DESCRIPTION

Figure 1:
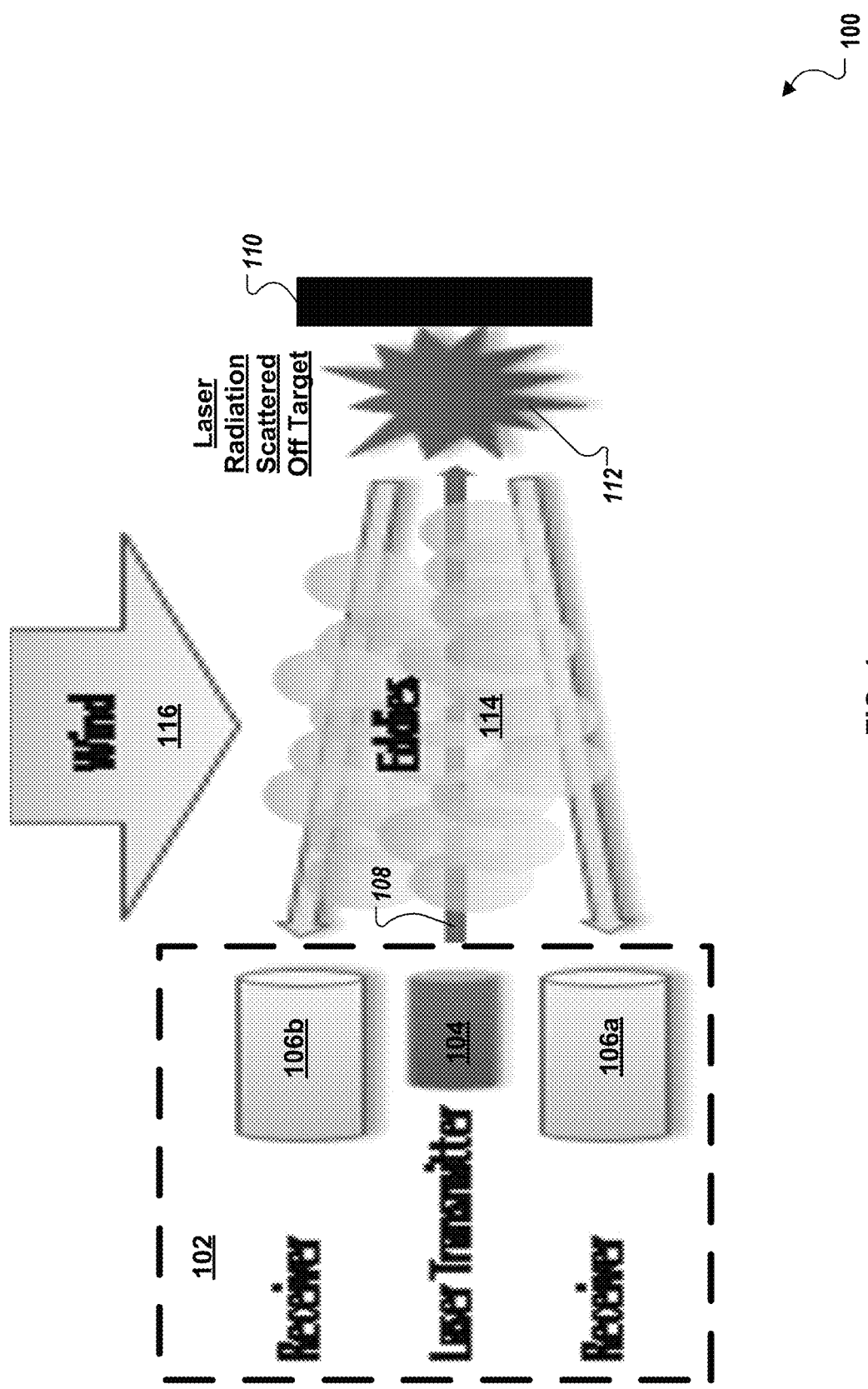
FIG. 1 is a block diagram illustrating a principle of operation of an example crosswind calculation system (CCS) unit in air according to an implementation.

This disclosure generally describes methods and systems for measuring crosswind speed by optical measurement of laser scintillation.

The following description is presented to enable any person skilled in the art to make and use the invention, and is provided in the context of a particular application and its requirements. By measuring movement of scintillation patterns along a path between an origin and destination, a cumulative crosswind speed measurement can be calculated. An example application includes providing a ballistic solution for a projectile along with a provided crosswind-corrective offset applied to enhance the likelihood that the projectile will impact an intended target. Various modifications to the disclosed implementations will be readily apparent to those skilled in the art, and the general principles defined herein may be applied to other embodiments and applications without departing from scope of the disclosure. Thus, the present disclosure is not intended to be limited only to the described and/or illustrated implementations, but is to be accorded the widest scope consistent with the principles and features disclosed herein.

Laser Radiation Scattering

Rayleigh scattering is the scattering of light or other electromagnetic radiation by particles smaller than the wavelength of light. For example, ambient light and/or a laser of sufficient power fired through a medium such as the atmosphere, gas, water, liquid, etc. causes atoms/molecules of gas/liquid to move at the same frequency of the laser radiation and become a small radiating dipole scattering the laser radiation. Similarly, Mie scattering results when roughly spherical particles approximately the size of the wavelength of the laser radiation, for example microscopic liquid droplets, particulates, dust, pollen, smoke, and the like, scatter the laser radiation when exposed to the laser.

Atmospheric Turbulence

Based at least partially on Kolmogorov's theory of 1941, it is known that temperature gradients in a gas or liquid cause the formation of small turbulent cells (or "eddies") of varying density. The eddies act as lenses and prisms to diffract/refract electromagnetic radiation passing through them causing modulations in apparent intensity of the radiation (or "scintillation"). Although the temperature gradients/intensity modulations are small for a given volume of gas/liquid, the cumulative effect of applied electromagnetic radiation, for example from a laser transmitter, passing through many moving eddies over a long distance is measureable by one or more receivers that detect and measure over time an eddy-caused scintillation pattern of Rayleigh/Mie scattered laser radiation along a path from an illumination laser transmitter to a particular target and/or scattered from the particular target. As eddies drift from gas/liquid current through a laser path, an associated scintillation pattern created by the eddies moves as well. A change in a scintillation pattern is measured and the measurement converted into a cumulative weighted average crosswind/crosscurrent speed for the entire path to the particular target for use in measuring a crosswind-corrective/crosscurrent-corrective offset.

Figure 2:
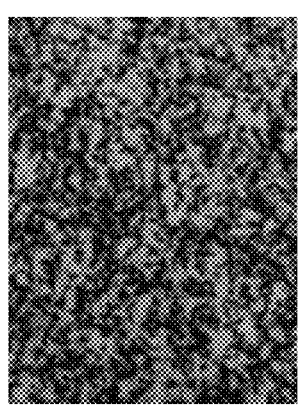
FIG. 2 illustrates an example scintillation pattern created by atmospheric eddies diffracting/refracting scattered laser radiation according to an implementation.

FIG. 1 is a block diagram 100 illustrating a principle of operation of an example crosswind calculation system (CCS) 102 unit in air according to an implementation. In some implementations, the CCS 102 includes a laser transmitter 104 and two receivers 106a/106b. An illumination laser 108 is transmitted from laser transmitter 104 and impacts target 110 resulting laser radiation from along the laser path and scattered laser radiation 112 reflecting back toward receivers 106a/106b and through atmospheric eddies 114. The atmospheric eddies 114 diffract/refract the laser radiation and form a scintillation pattern in air as the atmospheric eddies 114 are moved by wind 116. Turning to FIG. 2, FIG. 2 illustrates an example scintillation pattern 200 created by atmospheric eddies 114 diffracting/refracting scattered laser radiation 112 according to an implementation. Returning to FIG. 1, the cumulative intensity of the moving scintillation pattern is detected using "snapshots" of a series of scintillation pattern frames recorded simultaneously by each of receivers 106a/106b. Each frame provides data indicating an apparent intensity of the scattered laser radiation 112 varying with respect to time for each receiver 106a/106b (see FIG. 3 below).

The laser transmitter 104 is coupled with appropriate optics for illumination laser 108 focusing and transmission. The illumination laser 108 is used to illuminate a target. In some implementations, a target can include a gas/liquid, for example air/water, at a desired distance. In some implementations, the laser can operate in a continuous or pulsed mode. A continuously operating laser transmitter 104 can provide real-time, continuous crosswind speed calculations while a pulsed laser transmitter 104 can provide intermittent, as-needed crosswind speed calculations. In addition, if a laser is pulsed and receivers are gated, a given segment of distance between the laser source and the atmosphere at the distance can be measured. For example, crosswind speed can be measured in a segment of 100-120 m from the laser source. Next, a segment 120-140 m can be measured. In this manner, the average crosswind to each segment can be determined and the particular segment crosswinds also determined.

In some implementations, the laser transmitter emission axis 104 is bore sighted parallel to the detection axis of the receivers 106a/106b. In other implementations, the laser transmitter 104 emission axis is placed at an angle to the detection axis of the receivers 106a/106b. In some implementations, the CCS 102 does not include a laser transmitter 104 and instead depends upon sufficient ambient or other light sources to provide necessary illumination to detect atmospheric eddies between the CCS 102 and a target. For example, for daytime use, sunlight can provide sufficient illumination for scintillation pattern detection. In some implementations, other sufficient light sources may include high-intensity flood lights, security lights, flashlights, headlights, scattered illumination, targeting, and/or other laser light, and the like.

Typically each receiver 106a/106b is made up of one photodiode coupled with appropriate optics for focusing a separate received scintillation pattern image on the photodiode. The cumulative intensity of the light of the received scintillation pattern is converted by the photodiode into either current or voltage, depending on a photodiode mode of operation, which can then be analyzed in order to determine the individual scintillation pattern light intensity. In this manner, each photodiode can be considered as a single-pixel receiver in that it receives a scintillation pattern and converts the received scintillation pattern into a single data point measuring cumulative light intensity of the scintillation pattern. Known spacing between and a size of receivers 106a/106b are factored into detection/calculation software allowing each receiver to detect a particular scintillation pattern intensity and for the CCS 102 to compare multiple intensity determinations over time in order to further determine whether the scintillation pattern is moving, a direction of movement, a speed of movement, and a cumulative weighted average crosswind speed for the entire path to the particular target. The minimum number of receivers is one, but two or more receivers or one or more receivers with multiple photodiodes may be used to enhance crosswind calculation accuracy as well as provide multi-axis scintillation pattern movement determinations. Other receiver implementations can include multiple photodiodes and/or single photodiodes. In some instances, optics can be used to focus light on particular detector areas of a photodiode. In these instances, the use of the optics can allow the simulation of multiple individual/grouped photodiodes. For example, a quadrant detector (or simulated quadrant detector) can be used in some implementations.

Figure 3:
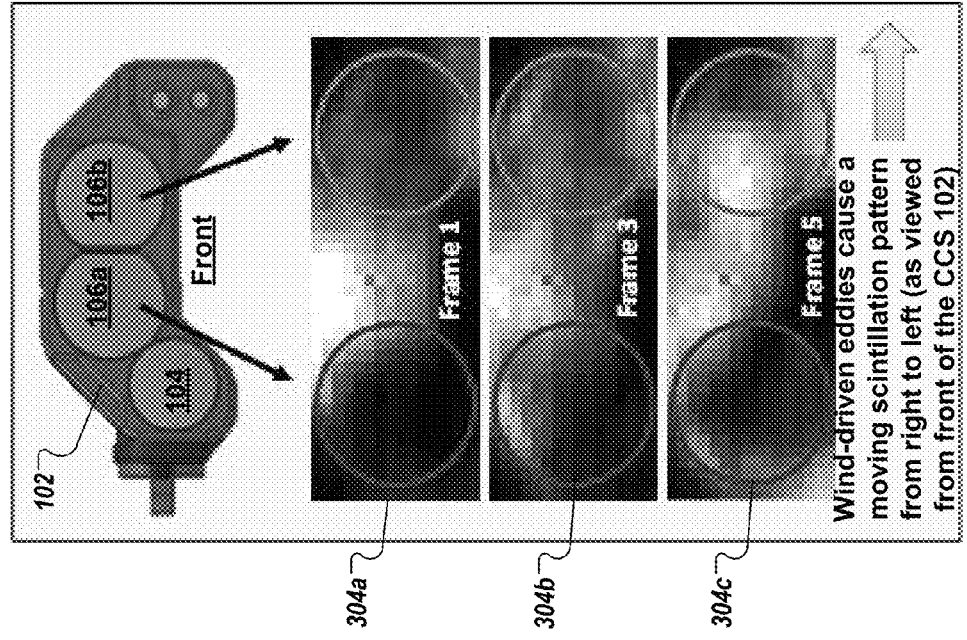
FIG. 3 illustrates example scintillation pattern frame snapshots of a moving scintillation pattern for two receivers according to an implementation.

FIG. 3 illustrates example scintillation pattern frame snapshots 300 of a moving scintillation pattern for two receivers according to an implementation. As illustrated, each receiver 106a/106b receives a separate image of a scintillation pattern in each of frames 304a, 304b, and 304c and each scintillation pattern image is converted into light intensity data. The scintillation pattern is illustrated as moving from right-to-left (as viewed from the front of the CCS 102) from receiver 106a to receiver 106b.

Figure 4:
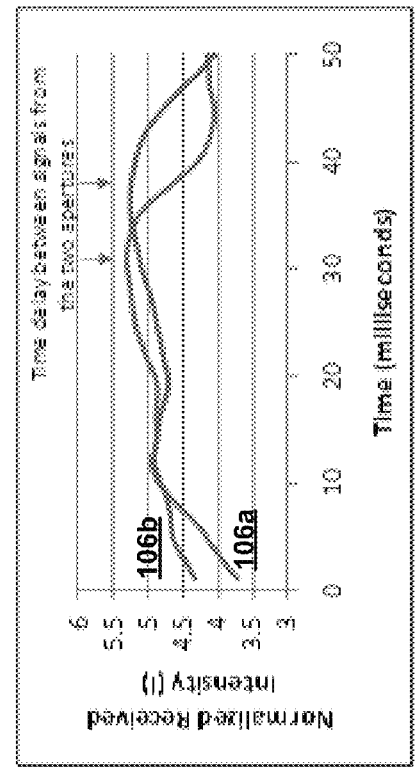
FIG. 4 illustrates an example plot of received light intensity per receiver over time according to an implementation as illustrated in FIG. 3.

FIG. 4 illustrates an example plot 400 of received light intensity per receiver over time according to an implementation as illustrated in FIG. 3. The plotted intensity shows that the peak intensity of the moving scintillation pattern of FIG. 3 first passes through receiver 106a and then receiver 106b. Using the plotted determined intensity data, the CCS 102 can determine that the scintillation pattern is moving from right to left. Additionally, given the spacing between receivers and size of the receivers, the CCS 102 can determine speed of movement and calculate a crosswind speed average. In some implementations, a simple calculation can be performed where a time delay between the signal of receiver 106a and 106b can be divided by a time it took the moving scintillation pattern to move a known distance between the receivers. Given an example closest distance between the receivers 106a/106b of 18 mm, the scintillation pattern is illustrated to have taken approximately 8 ms to move the 18 mm. The calculated example average crosswind speed would be 2.25 m/s or 5.0 mph. In other implementations, a cross-covariance (i.e., the similarity between two signals) of the two received scintillation pattern intensities is computed providing a more robust and accurate weighted average crosswind speed along the entire path from the CCS 102 to an intended target. In the case of a quadrant detector, a Greenwood frequency is calculated from measured light intensity data and the crosswind speed then derived.

FIGS. 5A-5D illustrate exemplary CCS 102 receiver configurations according to various implementations 500a-500d. FIG. 5A illustrates an implementation of a CCS 102 with a single receiver 502a. In one implementation, the receiver 502a is used in conjunction with a laser transmitter 104 emission axis where the angle between the laser transmitter 104 and the detection axis of the receiver 502a is varied by moving either the laser transmitter 104 or the receiver 502a. In one implementation, the laser transmitter 104 is movable. In this implementation, as an emitted illumination laser 108 crosses the receiver 502a's field-of-view, a scintillation pattern is created and received by the receiver 502a. The known angle of the illumination laser 108 to the receiver 502a is used as a data point in determining the distance from the receiver 502a and for subsequent calculations of the crosswind at that distance. Other variations include two receivers 502a/502b with a wider illumination laser 108 beam that covers both receiver fields-of-view simultaneously or the illumination laser 108 being configured to cross each receiver's field-of-view at a slightly different distance due to the laser transmitter 104 emission axis.

In another implementation, a receiver 502a detection axis can be moved to vary its angle with respect to a fixed emission axis of the laser transmitter 104. For example, assume an (X, Y) coordinate system where the X-axis is an illumination laser 108 placed at (−100, 0) and is firing toward higher values of X and a receiver 106 is placed at (0, −100) and faces toward higher Y values. If the receiver 106 is rocked from points (−10, 0), (0, 0), and (10, 0), scintillation patterns can be detected at each point along the path of the illumination laser 108. In these implementations, the laser transmitter 104 and/or receiver 502a can be moved using, for example, electric motors, mechanical methods, hydraulics, and/or other suitable methods.

FIG. 5B illustrates an implementation of a CCS 102 with two receivers 502*b*/504*b*. Typically this implementation is coupled with a laser transmitter 104 emission axis either boresighted parallel to the detection axes of receivers 502*b*/504*b* or a laser transmitter 104 emission axis at an angle to the detection axes of receivers 502*b*/504*b*. This implementation provides the capability to detect crosswind directional movement in one axis, for example left-to-right.

FIG. 5C illustrates an implementation of a CCS 102 with three receivers 502*c*/504*c*/506*c* arranged in a multi-axis configuration. For example, receivers 502*c*/504*c* can be considered to be on an X-axis while receivers 504*c*/506*c* can be considered to be on a Y-axis. Typically this implementation is coupled with a laser transmitter 104 emission axis either boresighted parallel to the detection axes of receivers 502*c*/504*c*/506*c* or a laser transmitter 104 emission axis at an angle to the detection axes of receivers 502*b*/504*b* detection axes. This implementation provides the capability to detect multi-axis crosswind directional movement, for example left-to-right as well as up-and-down. Additional receivers or receiver configurations could be used to provide additional directional detection or to enhance the accuracy of the measurements.

FIG. 5D illustrates an implementation of a CCS 102 with one four quadrant receiver 502*d*. The illustrated quadrant receiver 502*d* is divided into four separate photodetectors A-D, for example photodiodes, arranged in a multi-axis configuration and separated by a small distance where each photodetector detects an intensity of light falling on the particular photodiode. For example, each pair of photodetectors A-B and D-C can provide one axis of crosswind directional movement detection similar to the implementation described with respect to FIG. 5B. Likewise, photodetector pairs A-D and B-C can provide a perpendicular axis of crosswind directional movement detection. Combined, a single quadrant detector can provide the same dual-axis functionality as the implementation described with respect to FIG. 5C. In another implementation, the four quadrants can be used as two halves or in any other suitable configuration of the quadrants, including vertical, horizontal, and an 'X' pattern.

In other implementations, each photodetector can also be subdivided using optics to allow/restrict illumination of a portion of the photodetector. For example, optics with diaphragms can be used to allow/restrict illumination of the portions of the photodetector. In this manner, each single photodetector can be used to simulate multiple photodetector, for example a quadrant detector. In this implementation, for example, quadrant receiver 502*d* in FIG. 5D could be a single photodiode. Optics could then be used to create the A, B, C, and D quadrant configuration or any other number of distinguishable illuminated portions of the photodetector, including 2, 3, or 4 portions.

Figure 6:
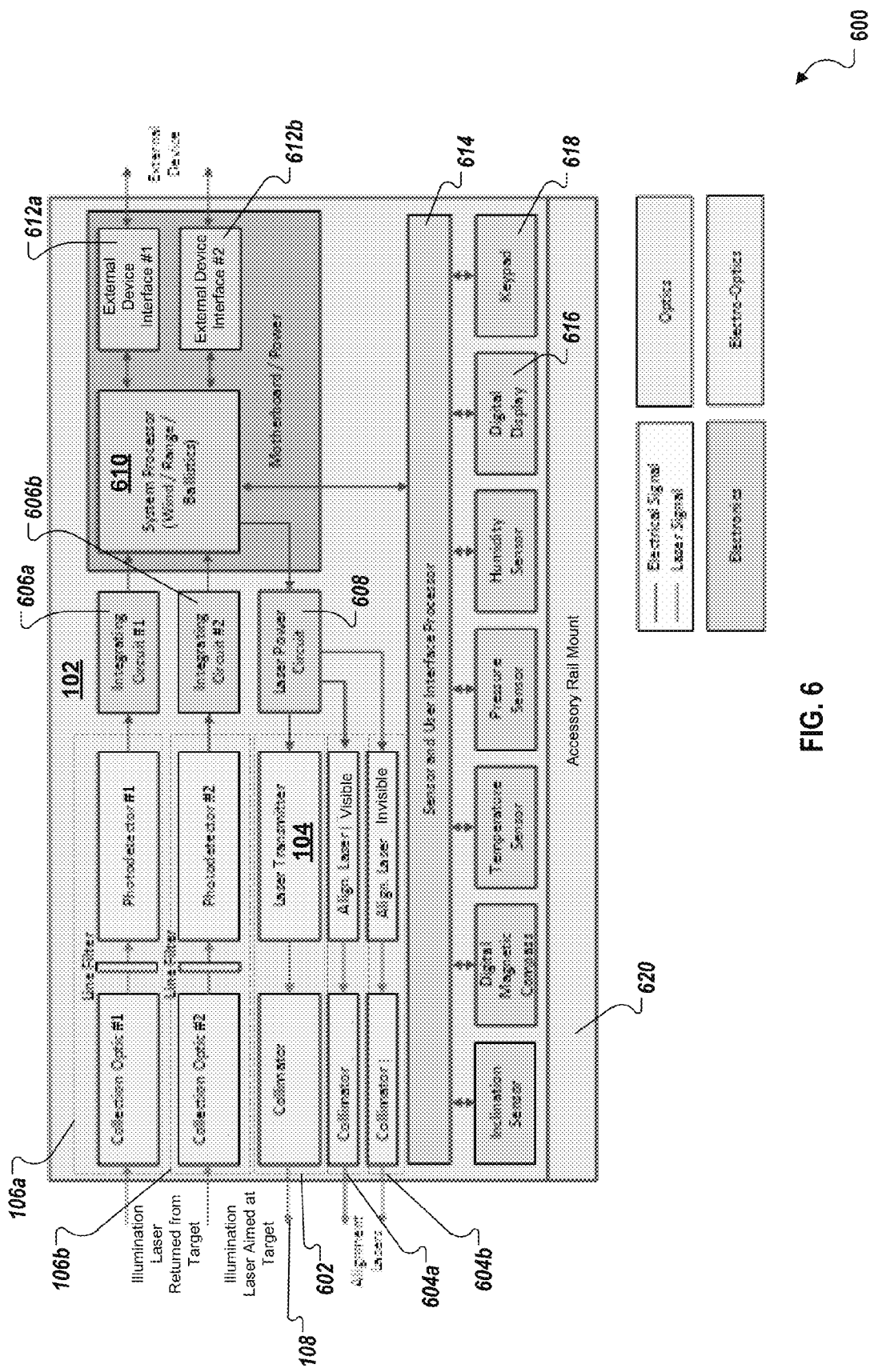
FIG. 6 is a block diagram illustrating hardware components of an example CCS unit according to an implementation.

FIG. 6 is a block diagram 600 illustrating hardware components of a CCS 102 according to an implementation. Each receiver 106*a*/106*b* includes a collection optic, line filter, and photodetector, for example a photodiode. Each collection optic reimages a scintillation pattern from a collection plane at the front of each receiver 106*a*/106*b* through a line filter and onto the photodetector. In some implementations, each receiver 106*a*/106*b* is focused at infinity to ensure that returned scattered laser radiation is collimated and to obtain a maximum amount of light on the photodetector. Collection optics can include, among others, optical filters and polarization/diffraction techniques to isolate specific atmospheric effects.

The illumination laser assembly 602 includes a collimator and a laser transmitter 104. The laser transmitter 104 can be, among other things, a light emitting diode (LED), a super-luminescent diode (SLD), a solid, chemical, and/or gas laser, and/or multiple lasers or arrays of laser emitters covering different laser powers, frequencies, and/or optical properties. For example, an emitted illumination laser 108 can be visible, invisible, and/or multi-frequency. The collimator narrows and aligns the output of the laser transmitter 104 to produce a narrow, focused illumination laser 108 with which to illuminate a target to produce scattered laser radiation 112 as shown in FIG. 1.

The alignment laser assemblies 604*a*/604*b* each also include a collimator and a laser transmitter to emit alignment lasers used to assist with aligning a CCS 102 with the riflescope crosshairs of a weapon the CCS 102 is mounted upon. The collimator associated with the alignment laser assemblies 604*a*/604*b* operates similarly to that in the illumination laser assembly 602. Each alignment laser assembly 604*a*/604*b* laser transmitter can also be a light emitting diode (LED), a super luminescent diode (SLD), a solid, chemical, and/or gas laser, and/or multiple lasers or arrays of laser emitters covering different laser powers, frequencies, and/or optical properties. For example, an emitted alignment laser can be visible, invisible, and/or multi-frequency. In some implementations, the pair of alignment laser assemblies 604*a*/604*b* can be made up of a visible and an invisible alignment laser. The visible alignment laser assembly 604*a* can be used, for example, during daytime and/or in a safe environment where visibility of an alignment laser is either necessary and/or not of concern to a CCS 102 operator. Likewise, the invisible alignment laser assembly 604*b* can be used during nighttime, where concealment of a CCS 102 operator is a priority, and/or in other environments where visibility of an alignment laser is not necessary and/or of concern to a CCS 102 operator. In some implementations, both alignment lasers can be used simultaneously. In some implementations, both alignment lasers can be either visible or invisible. In other implementations, there can be zero, one, or three or more available alignment laser assemblies.

The integrating circuits 606*a*/606*b* each sample an associated photodetector and transfer the data to system memory (not illustrated) where the data is accessed by internally stored applications (not illustrated) providing crosswind speed (wind calculator application (WCA)) and ballistic solution calculations (ballistic solver application (BSA)) executed by a main system processor 610. The WCA performs crosswind speed calculations based on the sampled photodetector data and weather/atmospheric data provided by integrated or connected weather/atmospheric sensors. The BSA provides projectile ballistic calculation and other related functionality (refer to FIGS. 8A-8G and associated descriptions below for additional information concerning BSA functionality) based upon ballistics data and the weather/atmospheric data provided by the integrated or connected weather/atmospheric sensors. The BSA computes wind influence on a projectile achieving six degrees-of-freedom using a three degree-of-freedom modified point mass numerical solver that considers velocity, time of flight, and bullet drop as a function of the projectile's position downrange until the projectile reaches the target taking into account current environmental conditions. The BSA fully accounts for Coriolis effects in both vertical and horizontal directions-of-fire, spin drift, and aerodynamic jump (the Magnus effect). The BSA contains all standard drag curves (G1, G7, etc.) and the ability to input/create custom drag curves for custom/designer projectiles.

Generally, the processor 610 executes instructions and manipulates data to perform the operations of the CCS 102. Specifically, the processor 610 executes instructions required to provide calculations and associated functionality for measuring crosswind speed by optical measurement of laser scintillation and providing ballistic solution calculations. Although illustrated as a single processor 610, two or more processors 610 may be used according to particular needs, desires, or particular implementations of the CCS 102.

The processor 610 is coupled with one or more external device interfaces 612a/612b used for connecting external devices to the CCS 102. The external device interfaces 612a/612b can support, for example, universal serial bus (USB), FIREWIRE, LIGHTNING, RS-232, BLUETOOTH, WiFi, wireless, cellular and/or other suitable interface type connectivity to the CCS 102. External devices could include a flash memory to store data, a computer to update internal software/application programs (not illustrated), a KESTREL brand pocket weather station (PWS) providing, among other things, temperature, pressure, and humidity data, a rifle scope, a spotting scope, a display, a recording device such as a computer or server to capture the data from the CCS 102, an array of wind turbines, and the like.

The sensor and user interface processor 614 is coupled with the processor 610 and provides functionality to integrate support for various built-in sensors (e.g., an inclination sensor, digital magnetic compass, temperature sensor, pressure sensor, humidity sensor, and the like) is available, a digital display 616, and a user input keypad 618. The digital display 616 provides, for example, textual and/or graphical data to a CCS 102 user regarding crosswind speed, ballistic solutions, target data, atmospheric data, and other suitable data. In some implementations, the digital display 616 can be configured to be removable in a communicably coupled manner with the CCS 102 unit, for example using a wired or wireless connection. In other implementations, a separate communicably coupled digital display 616 can be used in conjunction with a digital display 616 integrated into the CCS 102 unit. In this implementation, each digital display 616 can display different data to a CCS 102 user.

The user input keypad 618 allows a CCS 102 user to manually input data and or select menu options and/or functions/settings directly on the CCS 102 unit. In some implementations, the user input keypad 618 can be configured to be removable in a communicably coupled manner with the CCS 102 unit, for example using a wired or wireless connection. In other implementations, a separate communicably coupled user input keypad 618 can be used in conjunction with a user input keypad 618 integrated into the CCS 102 unit. In this implementation, each user input keypad 618 can be used to input different data to a CCS 102 unit.

The accessory rail mount 620 actuator provides functionality to attach the CCS 102 to an accessory mounting rail or base on, for example, a firearm or a scope. For example, the accessory rail mount 620 actuator can allow the CCS 102 to be mounted to a PICATINNY rail, WEAVER rail, tripod adapter, and other suitable accessory rail or base types. In other implementations, the accessory rail mount actuator 620 allows the CCS 102 to be mounted to accessory rails on vehicles, tripods, walls, towers, and other stationary and/or mobile structures.

Figure 7B:
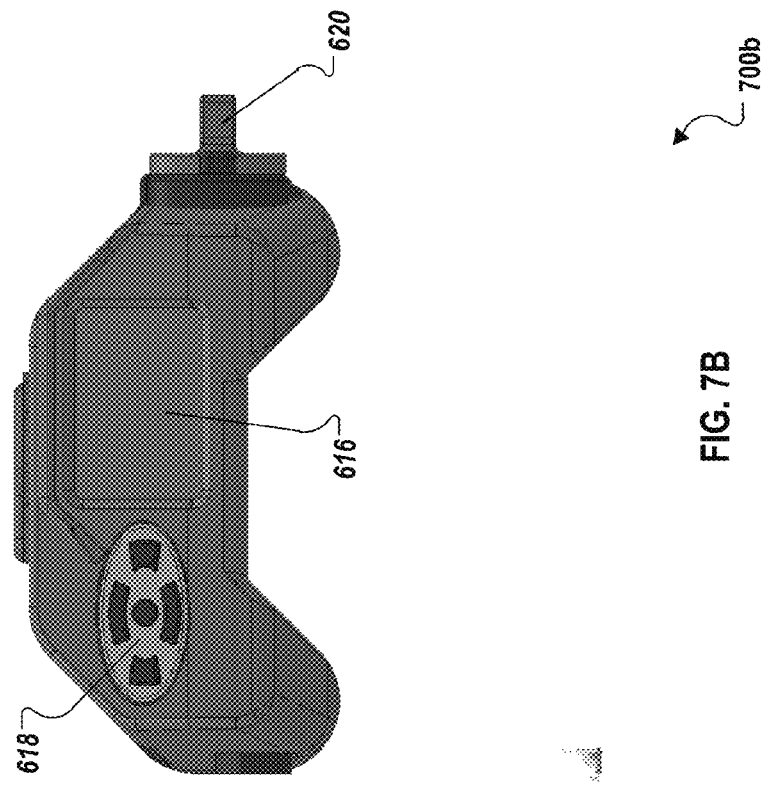
FIGS. 7A-7B illustrate a front and rear view of an implementation of a CCS unit according to an implementation.
Figure 7A:
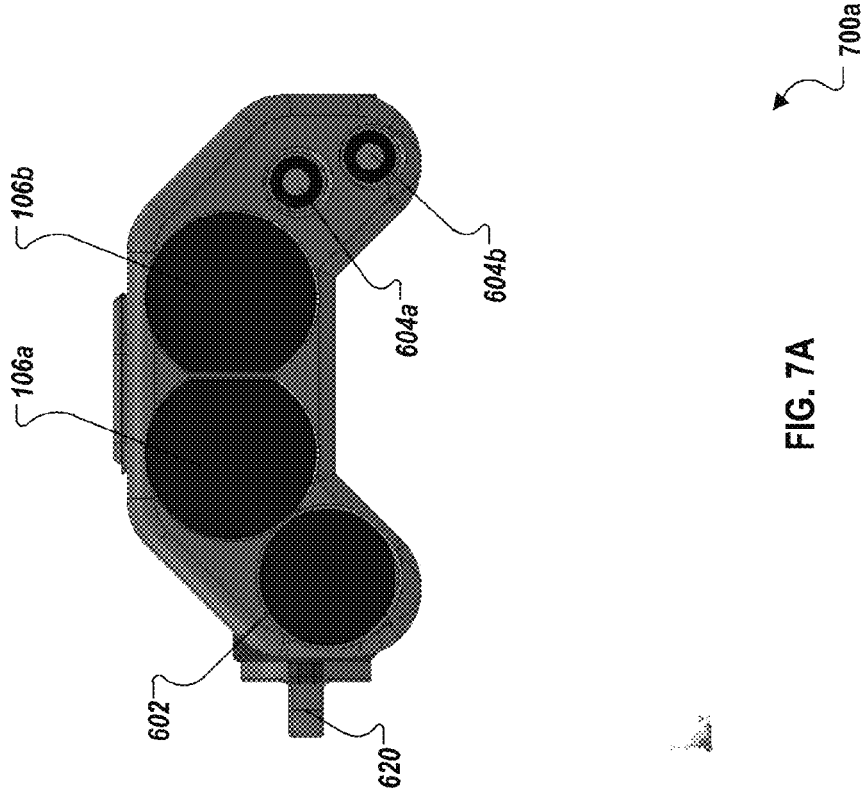

FIGS. 7A-7B illustrate a front and rear view of an implementation of a CCS unit according to an implementation. FIG. 7A illustrates a front view of the CCS 102 with receivers 106a/106b, illumination laser assembly 602, alignment laser assemblies 604a/604b, and accessory rail mount 620. Those of skill in the art will recognize that the provided implementation of a CCS 102 is only one of many possible implementations consistent with this disclosure. The provided implementation is not meant to limit the disclosure in any way.

FIG. 7B illustrates a rear view of the CCS 102 with digital display 616, user input keypad 618, and accessory rail mount 620. Those of skill in the art will recognize that the provided implementation of a CCS 102 is only one of many possible implementations consistent with this disclosure. The provided implementation is not meant to limit the disclosure in any way. In some implementations, the CCS 102 could be communicatively coupled with a rifle scope/sight and project all or a portion of the digital display 616 data into the rifle scope/sight for a weapon operator and/or assistant spotter. For example, range-to-target, target inclination, wind velocity, windage, and elevation are all information that could be provided to a scope user directly through scope itself. This projection would allow a weapon operator/spotter to remain on target without breaking visual contact to make adjustments or read the CCS 102 digital display 616.

Figure 7C:
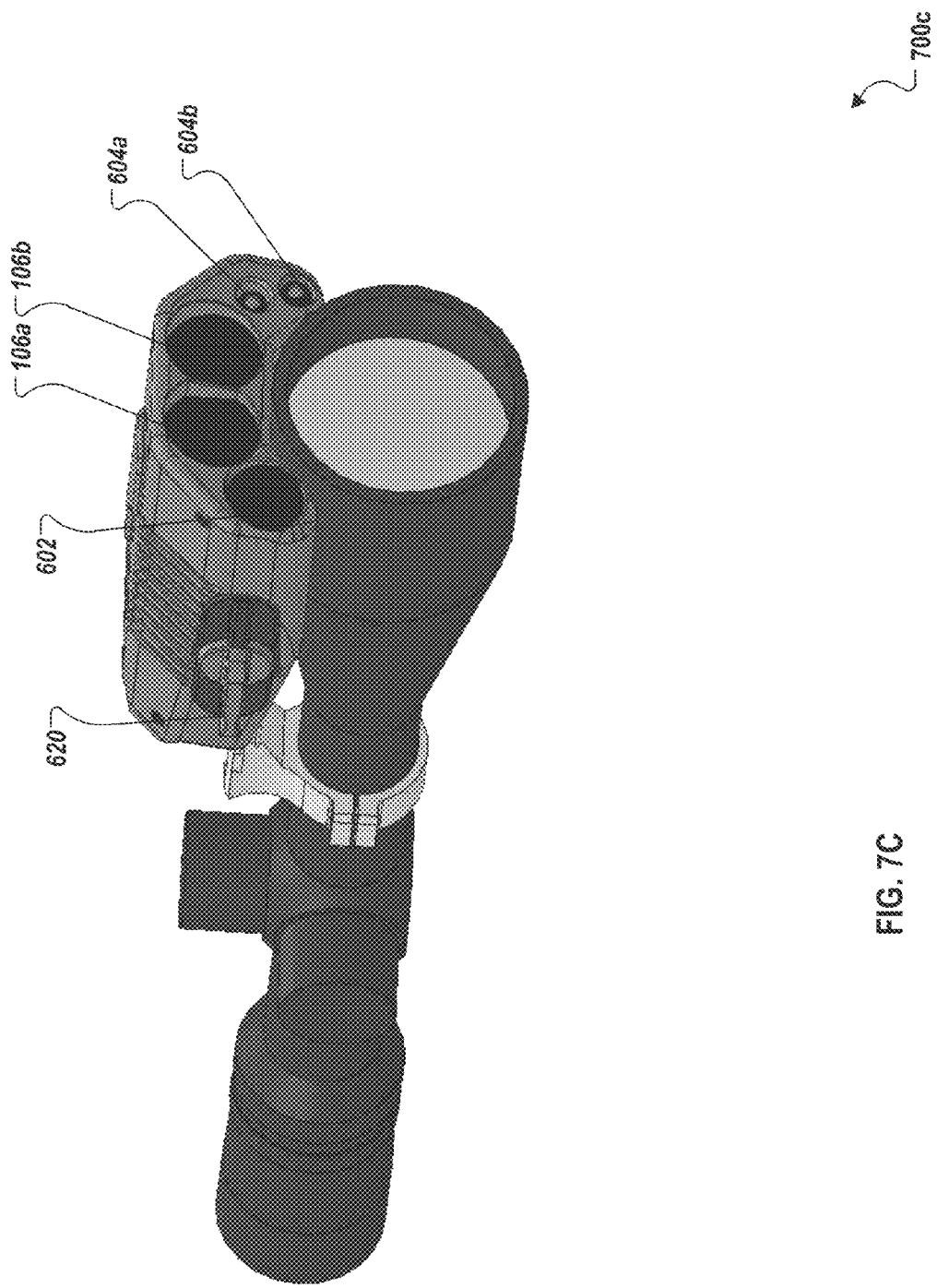
FIG. 7C illustrates a CCS unit mounted to a rifle scope according to an implementation.

FIG. 7C illustrates a CCS 102 unit mounted to a rifle scope according to an implementation 700c. In the illustration, the CCS 102 is mounted on the forward part of the rifle scope via an accessory rail. In other implementations, the CCS 102 can be mounted along the rifle scope in any suitable position.

FIGS. 8A-8G illustrate example screenshots of BSA user interfaces available when viewed on a computer display communicatively coupled to a CCS 102, for example using one or more of the external device interfaces 612a/612b. In some implementations, an external computer can also serve as a base station platform to input data, program, update, and/or troubleshoot the CCS 102. The external computer can also act as a graphical user interface for the WSA/BSA or other software executing within the CCS 102.

Figure 8A:
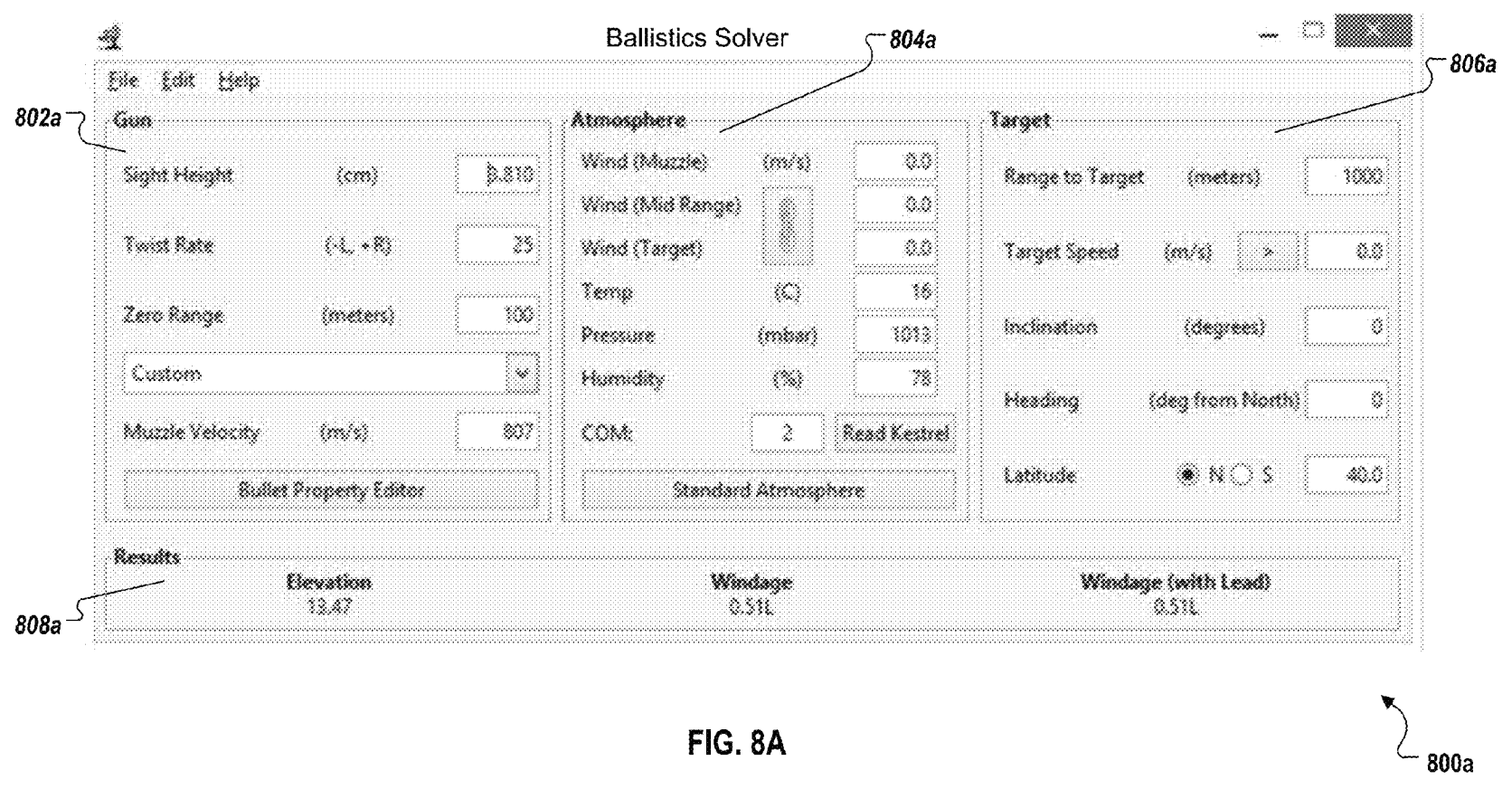

FIG. 8A is an example screenshot 800a of a ballistic solver application (BSA) user interface according to an implementation. The BSA is the ballistic solver/calculation software engine used by the WCA to determine a ballistic solution for entered weapon/projectile 802a (e.g., sight height, barrel twist rate, zero range, custom bullet properties, and muzzle velocity), atmosphere 804a (e.g., wind at muzzle, wind at mid-range, wind at target, temperature, pressure, and humidity), and target 514 (e.g., range to target, target speed, inclination, heading, and latitude) information to produce the ballistic solution. For example, a user can enter custom projectile properties using a bullet property editor (described below) to compare how a determined offset calculation 808a for a specific weapon/projectile 802a, atmosphere 804a, and/or target 806a data is affected by data changes. In the example screenshot, the user is presented with an aiming elevation offset of 13.47 and windage setting of 0.51 to the left.

Figure 8B:
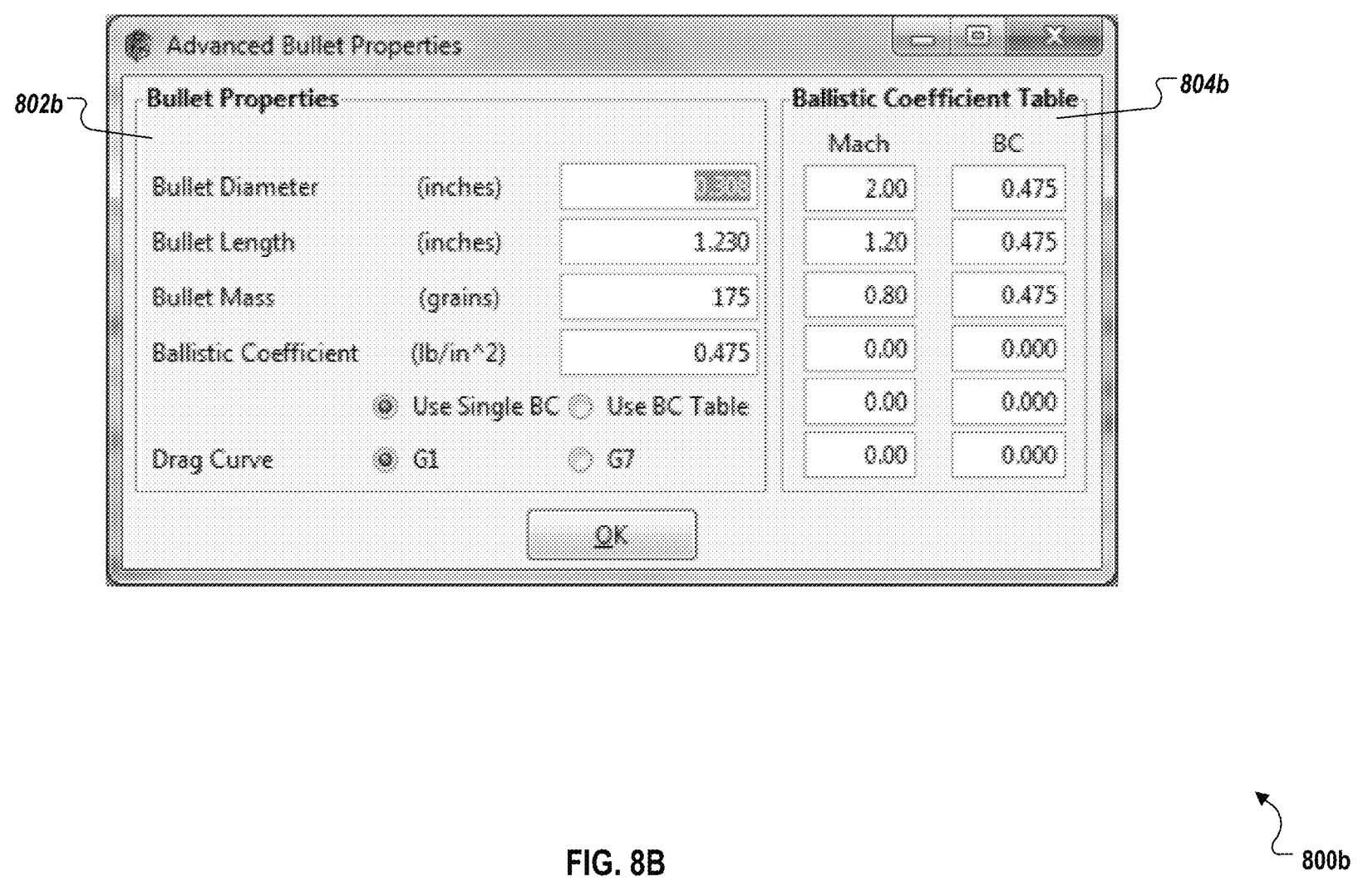

FIG. 8B is an example screenshot 800b of an advanced bullet properties data entry dialog external user interface for the BSA 112 according to an implementation. A user can enter advanced bullet properties using the presented data entry fields that are factored into a ballistic solution provided by the BSA. For example, the user can select the "Bullet Property Editor" GUI button on the WCA and/or BSA application user interface to enter bullet properties 802b (e.g., bullet diameter, bullet length, bullet mass, ballistic coefficient, and drag curve type) and ballistic coefficient table 804b table values (e.g., Mach and ballistic coefficient (BC) values).

Figure 8C:
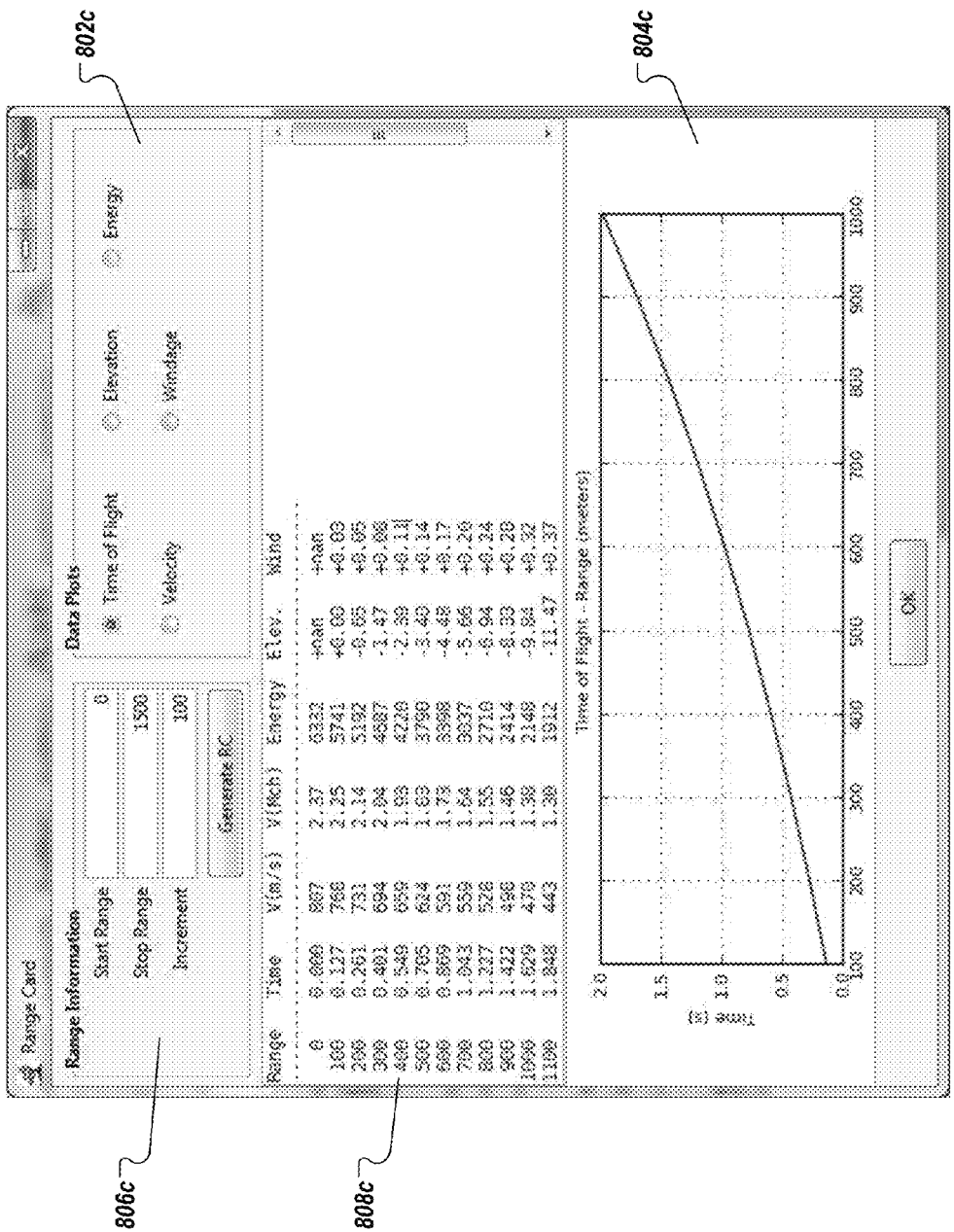
FIG. 8C is an example screenshot of a range card dialog user interface for the BSA according to an implementation.

FIG. 8C is an example screenshot 800c of a range card dialog user interface for the BSA 112 according to an implementation. In some implementations, a user can select to generate a range card from the WCA and/or BSA user interface menus. The generated range card 800c presents various types of selectable data plot options 802c (e.g., time of flight, elevation, energy, velocity, and windage) to generate graphical data plots 804c. In some implementations, the generated graphical data plots 804c can be overlaid for comparison purposes.) A user may enter specific range information 806c (e.g., start range, stop range, and increments) in order to generate range card data 808c for the user's reference. The range card 800c can be used for in-depth guidance of a weapon's effective range of operation for given operating conditions taking into account wind measurement and environmental data.

Figure 8D:
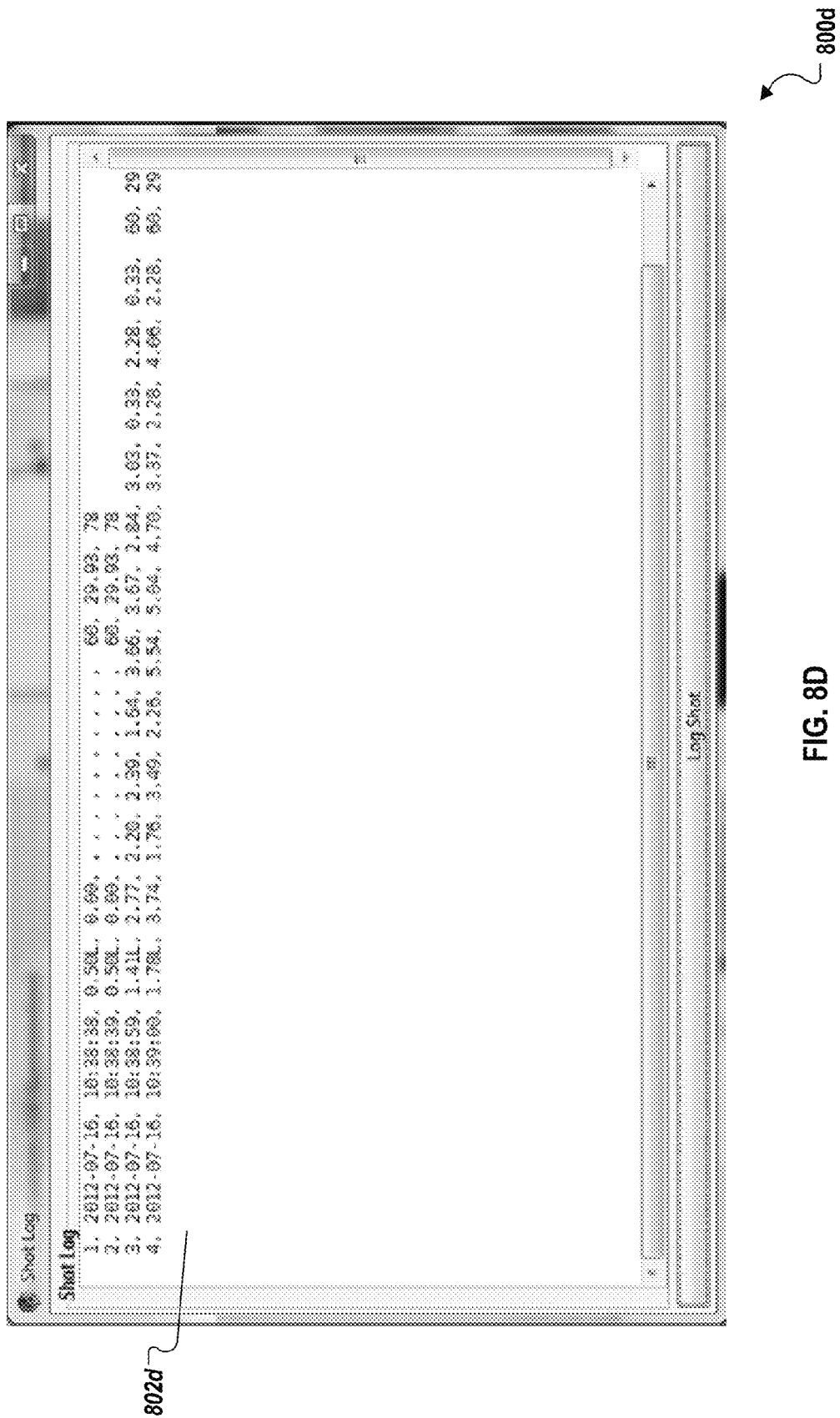
FIG. 8D is an example screenshot of a shot log dialog user interface for the BSA according to an implementation.

FIG. 8D is an example screenshot 800d of a shot log dialog user interface for the BSA 112 according to an implementation. In some implementations, a user can select to generate a shot log 802d from the WCA and/or BSA user interface menus. The generated shot log 802d records a captured data set of data and time, windage hold, readings from all reporting ASP 150 units, temperature, pressure, humidity, and the like for later analysis. The user can use the shot log to compare hit/miss results with the recorded data.

Figure 8E:
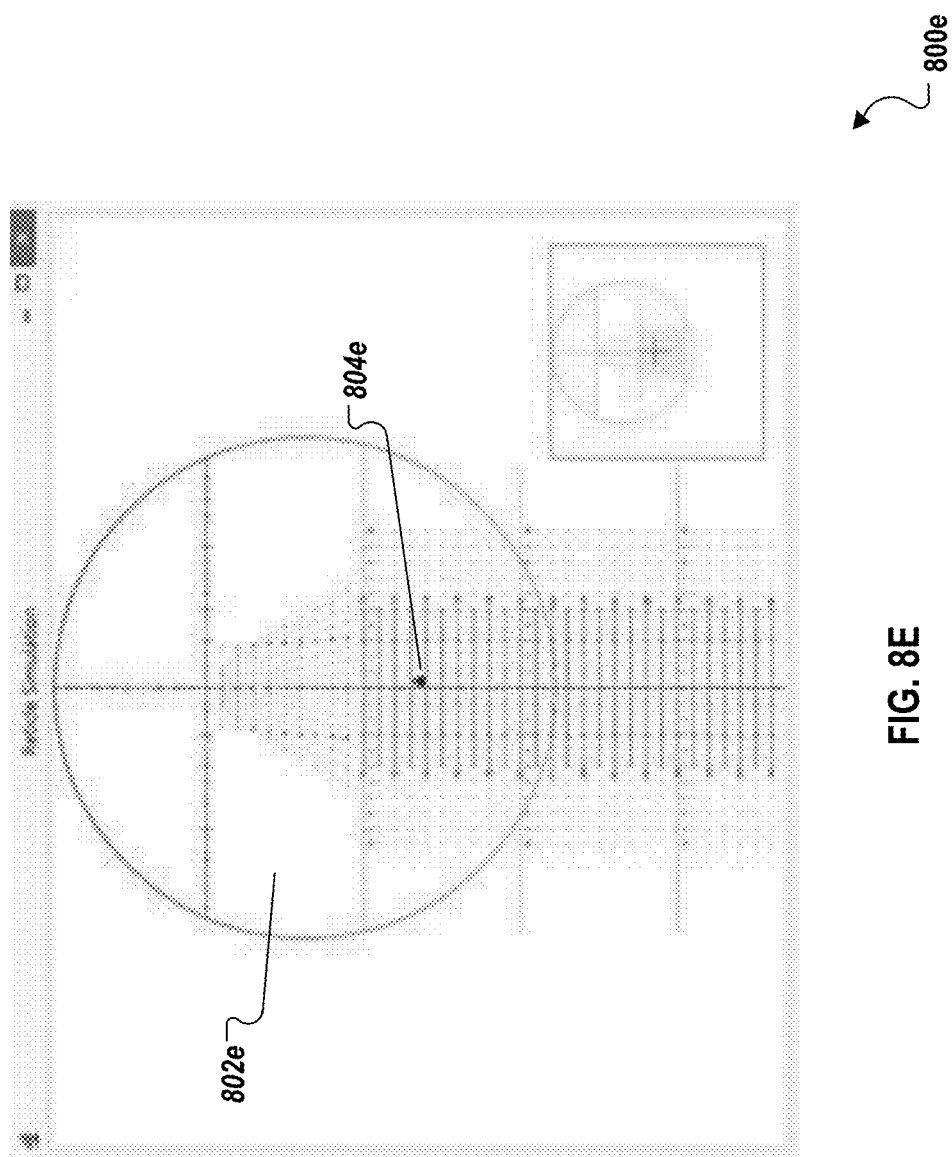
FIG. 8E is an example screenshot of a simulated reticle user interface for the BSA according to an implementation.

FIG. 8E is an example screenshot 800e of a simulated reticle user interface for the BSA 112 according to an implementation. In some implementations, a user can select to generate a simulated reticle 802e visually indicating how the user would use a real weapon sight reticle to match a presented offset calculation by either the WCA and/or BSA. The BSA can simulate various types of reticles, including fine crosshair, duplex crosshair, mil-dot, modern range finding, and any other suitable reticle type. The reticle simulations can be used for training purposes and to train users the proper use of various reticles for the same presented offset calculations. In some implementations, the CCS 102 could be communicatively coupled with a sighting device, for example a rifle scope/sight, and can initiate projection of and/or project the simulated reticle into the sighting device such that it is viewable by an operator of the sighting device. In the case of a weapon operator and/or assistant spotter, a projection would allow a weapon operator/spotter to remain on target without breaking visual contact with the target to make adjustments or read the CCS 102 digital display 616. The weapon operator/spotter could also easily change reticles to one most advantageous to a current target engagement situation, wind, and/or atmospheric conditions. In some implementations, the CCS 102 can make recommendations to a weapon operator/spotter as to which reticle to use. In some implementations, the projection can display a proper point-of-aim/projected impact point for operator reference. For example, the simulated reticle can project where a projectile is projected to impact without applied offsets, a projected impact point with corrected offsets, and/or a real-time visual indication of a hold offset that can change as the weapon is moved due to digital compass, inclinometer, and other sensor data. An example of a projected impact point is indicated impact point 804e. As will be apparent to those of skill in the art, other suitable data points can be provided to a weapon operator.

In other implementations, a rifle scope/sight can be integrated into a CCS 102 system to provide fully integrated functionality. In other implementations, one or more of WSA 110 and/or BSA 112 can be integrated into a rifle scope/sight without the laser illumination, detection, and laser alignment features of the described CCS 102. Other variations of CCS 102 feature integration with a rifle scope/sight consistent with this disclosure are also envisioned.

FIGS. 8F-8G are example screenshots 800f/800g of mobile device user interfaces for the BSA 112 according to an implementation. FIG. 8F illustrates an example screenshot 800f of target data entry fields 802f (e.g., name, range, inclination, and heading). As illustrated, the interface will also allow the entry of data related to environment, weapon, and bullet consistent with the data fields described above with respect to at least FIGS. 5 and 8A-8B. An offset calculation 804f for the entered data is also presented. In the example screenshot 800f, the user is presented with an aiming offset elevation of 13.39 and windage setting of 0.5 to the right.

FIG. 8G illustrates an example screenshot 800g of a simulated reticle user interface. As illustrated, the interface provides a reticle 802g, target distance 804g, wind direction and speed 806g, a quick determination target speed and direction indication 808g (e.g, here the target is indicated as moving to the right slowly), and offset calculation data 810g. In the example screenshot 800g, the user is presented with an aiming offset elevation of 29.5 and windage setting of 11.4 to the right.

Those of skill in the art will appreciate that each provided example GUI screenshot is only one of a multitude of possible GUI implementations depending on, for example, the use of various operating systems, computer hardware, display technologies, software standards, software protocols, and the like. The provided examples are meant to only illustrate possible GUI interfaces consistent with this disclosure and are not meant to be limiting in any way.

FIGS. 9A-9D illustrate example CCS 102 unit digital display 616 screenshots 900a-900d according to an implementation. FIG. 9A illustrates the display of a ballistic offset calculation provided by the CCS 102 along with a target range and wind speed. In the example screenshot 900a, the user is presented with an aiming offset elevation of 16.6 and windage setting of 2.3 to the left for a target at 1089 with a wind speed of 5.0 to the right.

FIG. 9B illustrates the display of a target range and heading. In the example screenshot 900b, the target is indicated as 1089 m at a heading of 204 degrees.

FIG. 9C illustrates the display of target heading, CCS 102 inclination, and target latitude/longitude information. In the example screenshot 900c, the target heading is 203 degrees, inclination is 1 degree, latitude is 41.028388, and longitude is −81.625396.

FIG. 9D illustrates the display of atmospheric temperature, pressure, and humidity. In the example screenshot 900d, the temperature is 76.8 F, pressure is 28.89 inHg, an Humidity is 42.0%.

Each of these displays could be viewed through a scope as part of the image visible to an operator or shown on a separate display. Those of skill in the art will appreciate that each provided example digital display screenshot is only one of a multitude of possible implementations of data and how it can be displayed to a user. The provided examples are meant to only illustrate data digitally displayed in a manner consistent with this disclosure and are not meant to be limiting in any way.

FIGS. 10A-10C illustrate additional applications 1000a-1000c for CCS technology.

FIG. 10A illustrates the application 1000a of CCS 102 technology to provide crosswind speed calculations to increase the efficiency of wind turbines. In typical operation, wind turbine rotor blades 1002*a* adjust themselves in a proactive manner depending upon crosswind conditions detected at or approaching a wind turbine rotor assembly. In an implementation, a CCS 102 system can be mounted on the wind turbine rotor assembly with the illumination laser 108 transmitting into the air to the front of the wind turbine. It should be noted that the illumination laser 108 does not need to be aimed at a specific reflecting target, and may just be transmitted into the air. As the crosswind is analyzed ahead of the wind turbine rotor assembly, the wind turbine rotor blades 1002*a* can proactively adjust themselves 1004*a* for the arriving wind conditions, increasing overall wind turbine efficiency. In other implementations, illumination laser(s) 108 can be transmitted to any side of the wind turbine to provide analysis of crosswinds to the side. In other implementations, multiple CCS 102 systems can be coupled to the control system for one or more wind turbines to provide information regarding the wind approaching, for example, a wind farm thereby allowing the control system to proactively adjust one or more wind turbines. Such coupling could be wired or wireless.

FIG. 10B illustrates the application 1000*b* of CCS 102 technology to provide crosscurrent speed calculations to increase the efficiency of water turbines 1002*b* and water-going vessels 1004*b*. In typical operation, water turbine 1002*b* rotor blades and water-going vessels 1004*b* adjust themselves in a reactive manner depending upon crosscurrent conditions detected at the water turbine 1002*b* rotor assembly and water-going vessel 1004*b*. In an implementation, a CCS 102 system can be mounted on the water turbine 1002*b*/water-going vessel 1004*b* with the illumination laser 108*a*/108*b* transmitted into the water. It should be noted that the illumination lasers 108 do not need to be aimed at a specific reflecting target, and may just be transmitted into the water. As the range current/crosscurrent is analyzed ahead of the water turbine 1002*b*/water-going vessel 1004*b*, the water turbine 1002*b* rotor blades/water-going vessel 1004*b* can proactively adjust themselves for the arriving current conditions, increasing overall turbine/vessel efficiency. In other implementations, illumination laser(s) 108 can be transmitted to any side of a water turbine 1002 rotor assembly or water-going vessel 1004*b* to provide analysis of crosscurrents to the side.

FIG. 10C illustrates the application 1000*c* of CCS 102 technology to provide crosswind speed calculations to increase the efficiency of landing operations on an aircraft carrier. In typical operation, aircraft launch into the wind and land with the wind. The aircraft carrier operations center 1002 can introduce turbulence as it breaks up wind flow. In addition, normal air currents introduce range wind and crosswind across the aircraft carrier deck causing pilots to continuously and reactively adjust aircraft 1004*b* pitch, roll, and yaw while landing. In an implementation, a CCS 102 system can be mounted on the aircraft carrier, in possibly an overlapping pattern, and/or aircraft with the illumination lasers 108 analyzing crosswinds. It should be noted that the illumination lasers 108 do not need to be aimed at a specific reflecting target and may just be transmitted into the air. In some implementations, the system can be used to proactively assist the pilot in landing with automated landing functions, landing assistance functions, and/or graphical displays/warnings regarding wind conditions. In other implementations, the same principles could be applied for airports and other aircraft landing zones. In another example, the principles could be used to determine cross- wind speeds/patterns prior to and during fireworks displays to determine if wind/atmospheric conditions are safe for the use of fireworks.

Figure 10D:
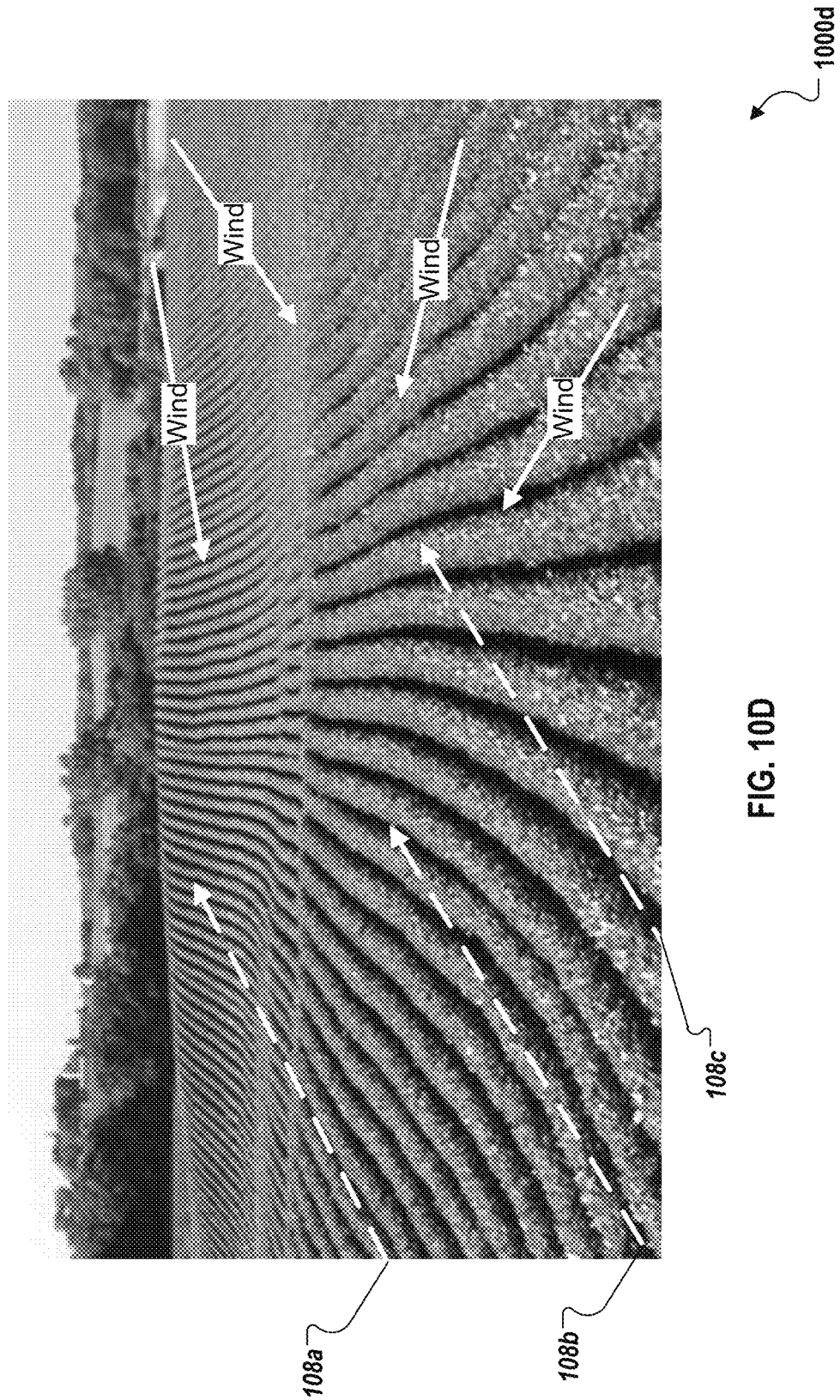

FIG. 10D illustrates the application 1000*d* of CCS 102 technology to provide crosswind speed calculations of a field of crops. Winds over the field of crops affect, for example, pollen transfer, pesticide/fertilizer distribution, pest dispersion, irrigation water dispersion, humidity conditions, and the like. A CCS 102 system(s) can be placed in the field of crops and used to determine crosswinds. Knowing the crosswinds over the field of crops can permit more accurate fertilizer and pesticide dispersion, more efficient irrigation, predictive pollination studies, and the like. It should be noted that the illumination lasers 108*a*-108*c* do not need to be aimed at a specific reflecting target and may just be transmitted into the air. In other implementations, the same principles could be applied to wind turbine farms (e.g., to provide similar and/or complementary data to that discussed in FIG. 10A) for golf courses, large lawns, and predictive dispersal of pollution, toxic chemicals, bio-agents, and/or radiation plumes from nuclear accidents. In another example, the CCS technology could be used to determine winds ahead of a water-going vessel to better adjust sails and/or be prepared for wind changes or to gauge flow in industrial pipes/pipelines to provide flow control.

In other implementations, a CCS 102 system can be coupled with a laser range finder (LRF) to provide laser ranging of a target and crosswind speed analysis simultaneously. Coupling can be accomplished by wired, wireless, and/or other suitable connections between the LRF and the CCS 102 system. A LRF can be coupled with any of the CCS implementations described herein. For example, for shooting sports, a shooter could use the combined instrument to simultaneously determine a range to a target and crosswind. Likewise, the described combined instrument could be used in sports such as golf to assist a player with determining a range to a hole and factoring in winds for a golf hit.

In other implementations, the CCS 102 system can include and provide integrated LRF functionality. For example, the illumination laser 108 or an alignment laser can be used in conjunction with included LRF application software and/or hardware (not illustrated) to provide the integrated LRF functionality. In some implementations, two or more of the illumination laser 108 and/or alignment lasers can be used to provide, for example, increased LRF accuracy and range. Integrated LRF functionality can be coupled with any of the CCS implementations described herein.

In another implementation, the CCS 102 system can provide data to an automated weapon system. The weapon system can include computers, servers, platforms, electric motors/servo-mechanisms and associated components to provide multi-axis movement, and/or the like. For example, the CCS-system-provided ballistic and/or crosswind speed measurement data can be used by the automated weapon system to automatically aim a weapon at a target and/or track a target with a weapon. In some implementations, the weapon can also be automatically fired by the automated weapon system responsive to data provided by the CCS 102 system. Another implementation could include the CCS-system-provided ballistic and/or crosswind speed measurement data used to physically adjust the zero of a weapon sighting device to account for the effects of the data on a projectile, thus saving a weapon operator from making sighting device adjustments and/or holding based on provided offset/windage values.

FIG. 11 is a flow chart of an example method of measuring crosswinds according to an implementation. For clarity of presentation, the description that follows generally describes method 1100 in the context of FIGS. 1-4, 5A-5D, 6, 7A-7C, 8A-8Q 9A-9D, and 10A-10C. However, it will be understood that method 1100 may be performed, for example, by any other suitable system, environment, software, and hardware, or a combination of systems, environments, software, and hardware as appropriate. In some implementations, various steps of method 1100 can be run in parallel, in combination, in loops, or in any order.

At 1102, radiation is emitted into a medium. In some implementations, the radiation can be from a laser. In other implementations, the radiation can be from ambient light, such as sunlight. In some implementations, the medium can be a gas or a liquid, for example air or water. The radiation need to be emitted toward a particular target. In some implementations, a target can be considered to be the medium itself. From 1102, method 1100 proceeds to 1104.

At 1104, receiving, over time, a plurality of scintillation patterns of scattered radiation from the emitted radiation. The scintillation patterns are received with a photodetector receiver, for example a photodiode. From 1104, method 1100 proceeds to 1106.

At 1106, cumulative radiation intensity for each received scintillation pattern is compared. In some implementations, changing cumulative radiation intensity can be used to determine that a scintillation pattern is moving. From 1106, method 1100 proceeds to 1108. At 1108, a cumulative weighted average cross-movement within the medium is measured using the compared cumulative radiation intensities. From 1108, method 1100 stops.

FIG. 12 is a flow chart of an example pre-mission readiness method 1200 according to an implementation. For clarity of presentation, the description that follows generally describes method 1200 in the context of FIGS. 1-4, 5A-5D, 6, 7A-7C, 8A-8Q 9A-9D, 10A-10C, and 11. However, it will be understood that method 1200 may be performed, for example, by any other suitable system, environment, software, and hardware, or a combination of systems, environments, software, and hardware as appropriate. In some implementations, various steps of method 1200 can be run in parallel, in combination, in loops, or in any order.

At 1202, a weapon operator/assistant spotter enters weapon/projectile data into an embedded ballistics application of the crosswinds calculation system (CCS). Weapon data can include sight height, zero range, rifle barrel twist rate, and other suitable data. Projectile data can include bullet diameter, bulled weight, ballistic coefficient, muzzle velocity, and other suitable data. From 1102, method 1200 proceeds to 1204.

At 1204, the rifle scope on the weapon is zeroed. If the CCS is mounted on a spotting scope, this step is not necessary. From 1204, method 1200 proceeds to 1206.

At 1206, an alignment lasers is turned on to align the CCS with the riflescope crosshairs. From 1206, method 1200 proceeds to 1208.

At 1208, the mounted CCS is adjusted until the alignment laser is properly centered in the rifle scope crosshairs. From 1208, method 1200 proceeds to 1210.

At 1210, CCS settings are saved. From 1210, method 1200 proceeds to 1212.

At 1212, the weapon operator/assistant engages the target. From 1212, method 1200 stops.

FIG. 13 is a flow chart of a mission engagement method 1300 according to an implementation. For clarity of presentation, the description that follows generally describes method 1300 in the context of FIGS. 1-4, 5A-5D, 6, 7A-7C, 8A-8Q 9A-9D, 10A-10C, 11, and 12. However, it will be understood that method 1300 may be performed, for example, by any other suitable system, environment, software, and hardware, or a combination of systems, environments, software, and hardware as appropriate. In some implementations, various steps of method 1300 can be run in parallel, in combination, in loops, or in any order.

At 1302, a configured crosswinds calculation system (CCS) is powered ON. From 1302, method 1300 proceeds to 1304.

At 1304, weapon/ballistic parameters are optionally verified. From 1304, method 1300 proceeds to 1306.

At 1306, a weapon operator/assistant spotter indicates engagement to the CCS. In some implementations, the indication can include depressing a pressure switch on the weapon or a button on the CCS. From 1306, method 1300 proceeds to 1308.

At 1308, a target is lased and a full value crosswind is computed. Additionally, temperature, pressure, humidity, inclination angle, direction-of-fire, and latitude parameters are measured. In some implementations, more or less parameters are measured. From 1308, method 1300 proceeds to 1310.

At 1310, elevation and windage holds are displayed to the weapon operator/assistant spotter. From 1310, method 1300 proceeds to 1312.

At 1312, the weapon operator holds or dials the rifle scope to displayed elevation and windage values. From 1312, method 1300 proceeds to 1314.

At 1314, the weapon operator engages the target. From 1314, method 1300 stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. Accordingly, the above description of example implementations does not define or constrain this disclosure. Other changes, substitutions, and alterations are also possible without departing from the spirit and scope of this disclosure.

What is claimed is:

1. A device for optically measuring crosswind, comprising:
    a laser transmitter adapted to generate a laser to illuminate a path through an atmosphere;
    an optical receiver coupled with optics and configured to analyze the path of the laser through the atmosphere, the optical receiver subdivided into a plurality of distinct detecting areas, each detecting area spaced apart from other detecting areas at a known particular distance and acting as a separate photodetector to convert a received atmospheric scintillation pattern into a single data point measuring cumulative light intensity;
    a computer processor configured to compare the measured cumulative light intensity from each detecting area and to generate a crosswind profile along the path of the laser; and
    an actuator configured to vary an angle between the laser transmitter and the optical receiver.

2. The device of claim 1, wherein the optical receiver is divided into four detecting areas.

3. The device of claim 1, wherein the optical receiver is a single pixel diode.

4. The device of claim 1, wherein the scintillation pattern received by each detecting area is created by atmospheric eddies diffracting and refracting scattered laser radiation.

5. The device of claim 1, wherein at least one detecting area is oriented in a substantially perpendicular orientation in relation to the other detecting areas to provide multi-axis scintillation pattern movement determinations.

6. The device of claim 1, wherein the actuator belongs to a group consisting of an electric actuator, a mechanical actuator, and a hydraulic actuator.

7. The device of claim 1, wherein the receiver further comprises collection optics used to optically filter or isolate, using at least one of polarization or diffraction techniques, the scattered laser radiation in the atmosphere.

8. The device of claim 1, wherein the laser transmitter is adapted to emit a laser of differing power, frequency, or optical property.

9. The device of claim 1, wherein the computer processor is interoperably coupled to a computer memory and configured to:
    calculate a ballistic solution using the generated crosswind profile; and
    initiate transmission of the ballistic solution to an optical sighting device.

10. A device for optically measuring a cross-movement profile within a medium, comprising:
    an optical receiver coupled with optics and configured to analyze the path of radiation emitted by a radiation emitter through the medium, the optical receiver subdivided into a plurality of distinct detecting areas, each detecting area spaced apart from other detecting areas at a known particular distance and acting as a separate photodetector and spaced apart from other detecting areas at a known particular distance, each detecting area configured to receive, over time and from a substantially common direction, a plurality of snapshots of a moving scintillation pattern to convert each received snapshot into a single data point measuring cumulative light intensity;

a computer processor configured to compare the measured cumulative light intensity from each detecting area and to generate a cross-movement profile within the medium, the generation of the cross-movement profile a function of the particular spacing between, and a size of, each of the plurality of distinct detecting areas; and an actuator configured to vary an angle between the radiation emitter and the optical receiver.

11. The device of claim 10, wherein the medium is one of a liquid or a gas.

12. The device of claim 10, wherein the scintillation pattern received by each detecting area is created by eddies in the medium diffracting and refracting scattered radiation.

13. The device of claim 10, further comprising:
a computer memory configured to hold the generated cross-movement profile within the medium; and
a processor interoperably coupled to the computer memory and configured to calculate a ballistic solution using the generated cross-movement profile within the medium.

14. The device of claim 10, wherein the actuator belongs to a group consisting of an electric actuator, a mechanical actuator, and a hydraulic actuator.

15. A method for measuring cross-movement within a medium for medium-profiling purposes, comprising:
while varying an angle between a radiation emitter and an optical receiver with an actuator:
projecting radiation into the medium with the radiation emitter to illuminate a path through the medium;
receiving, over time, with the optical receiver coupled with optics and subdivided into a plurality of distinct detecting areas, a plurality of scintillation patterns, each scintillation pattern created by eddies in the medium diffracting and refracting scattered radiation, each detecting area spaced apart from other detecting areas at a known particular distance and acting as a separate photodetector;
for each detecting area, converting a received particular scintillation pattern into a single data point measuring cumulative radiation intensity;
comparing the cumulative radiation intensity for each received scintillation pattern of the received plurality of scintillation patterns; and
calculating a cumulative weighted average cross-movement within the medium along the path using the compared cumulative radiation intensities.

16. The method of claim 15, wherein the medium is one of a liquid or a gas.

17. The method of claim 15, wherein the optical receiver is a single pixel photodiode.

18. The method of claim 15, further comprising:
calculating a ballistic solution for a projectile using at least the calculated cumulative weighted average cross-movement within the medium; and
calculating a weapon aiming offset using the calculated ballistic solution.

19. The method of claim 15, further comprising:
determining that a particular scintillation pattern is moving by performing a cross-covariance computation between two or more scintillation patterns;
determining a direction-of-movement for the particular scintillation pattern; and
determining a speed-of-movement for the particular scintillation pattern.

20. The method of claim 15, wherein the actuator belongs to a group consisting of an electric actuator, a mechanical actuator, and a hydraulic actuator.

* * * * *